United States Patent
Frohman et al.

(10) Patent No.: US 9,584,047 B2
(45) Date of Patent: Feb. 28, 2017

(54) BIDIRECTIONAL POWER CONVERTER HAVING A CHARGER AND EXPORT MODES OF OPERATION

(71) Applicant: Engineered Electric Company, Bridgeport, CT (US)

(72) Inventors: Gene H. Frohman, Woodbridge, CT (US); Scott Ramsay, Oxford, CT (US); Keven Roche, West Haven, CT (US); Thomas Parsons, Bridgeport, CT (US); Michael Kelley, Bridgeport, CT (US); John Thompson, Bridgeport, CT (US); Scott McMillan, Bridgeport, CT (US); Jessica Farace, Bridgeport, CT (US); Matthew Tarca, Bridgeport, CT (US); David Gellis, Bridgeport, CT (US)

(73) Assignee: HDT Expeditionary Systems, Inc., Solon, OH (US)

( * ) Notice: Subject to any disclaimer, the term of this patent is extended or adjusted under 35 U.S.C. 154(b) by 226 days.

(21) Appl. No.: 14/211,719

(22) Filed: Mar. 14, 2014

(65) Prior Publication Data

US 2014/0268959 A1    Sep. 18, 2014

Related U.S. Application Data

(60) Provisional application No. 61/785,786, filed on Mar. 14, 2013, provisional application No. 61/893,017, filed on Oct. 18, 2013.

(51) Int. Cl.
*H02M 5/45*    (2006.01)
*H02M 7/797*    (2006.01)
(Continued)

(52) U.S. Cl.
CPC ........... *H02M 7/797* (2013.01); *H02M 5/297* (2013.01); *H02M 7/4807* (2013.01)

(58) Field of Classification Search
CPC .............................. H02M 7/515; H02M 7/537
(Continued)

(56) References Cited

U.S. PATENT DOCUMENTS 3,742,336 A * 6/1973 Bedford .......................... 363/1
4,555,755 A  11/1985 Kurosawa et al.
(Continued)

FOREIGN PATENT DOCUMENTS

CN    102075109 A    5/2011
JP    07-327374 A    12/1995

OTHER PUBLICATIONS

Yilmaz, M., and Krein, P. T., "Review of Charging Power Levels and Infrastructure for Plug-In Electric and Hybrid Vehicles and Commentary on Unidirectional Charging," [PowerPoint Presentation], 2012 IEEE International Electrical Vehicle Conference (IEVC'12), Mar. 7, 2012, South Carolina, USA, pp. 1-34.
(Continued)

*Primary Examiner* — Adolf Berhane
*Assistant Examiner* — Nusrat Quddus
(74) *Attorney, Agent, or Firm* — Fay Sharpe LLP

(57) ABSTRACT

A bidirectional power converter that can be used in an electric vehicle to perform AC to DC power conversion to charge the electric vehicle's battery and to perform DC to AC power conversion to export power to run external electrical loads is described. The bidirectional power converter may include an AC interface coupled to a cyclo-inverter circuit, and a DC interface coupled to a H-bridge circuit. The cyclo-inverter can be electrically coupled to the H-bridge circuit through a transformer. The bidirectional power converter may include a neutral terminal on the AC interface that is coupled to the transformer through a filtering inductor.

19 Claims, 14 Drawing Sheets

(51) Int. Cl.
*H02M 5/297* (2006.01)
*H02M 7/48* (2007.01)

(58) Field of Classification Search
USPC ......... 363/13, 16, 17, 97, 98, 123, 125, 127, 363/131–134
See application file for complete search history.

(56) References Cited

U.S. PATENT DOCUMENTS

| | | | |
|---|---|---|---|
| 4,719,550 A * | 1/1988 | Powell et al. | 363/37 |
| 6,021,052 A * | 2/2000 | Unger et al. | 363/26 |
| 6,507,503 B2 | 1/2003 | Norrga | |
| 7,275,622 B2 | 10/2007 | Hall et al. | |
| 7,558,087 B2 | 7/2009 | Meysenc et al. | |
| 7,690,456 B2 | 4/2010 | Deng et al. | |
| 7,889,524 B2 | 2/2011 | Lee et al. | |
| 2002/0176261 A1 | 11/2002 | Norrga | |
| 2004/0062059 A1 | 4/2004 | Cheng et al. | |
| 2006/0062034 A1 | 3/2006 | Mazumder et al. | |
| 2008/0111512 A1 * | 5/2008 | Theunissen et al. | 318/466 |
| 2008/0198637 A1 | 8/2008 | Meysenc et al. | |
| 2008/0298103 A1 | 12/2008 | Bendre et al. | |
| 2008/0304296 A1 | 12/2008 | NadimpalliRaju et al. | |
| 2009/0196082 A1 * | 8/2009 | Mazumder | H02M 5/458 363/132 |
| 2010/0236612 A1 | 9/2010 | Khajehoddin et al. | |
| 2012/0014140 A1 | 1/2012 | Kajouke et al. | |
| 2012/0163035 A1 | 6/2012 | Song et al. | |
| 2012/0170341 A1 | 7/2012 | Fornage et al. | |
| 2012/0206104 A1 | 8/2012 | Tsuchiya | |
| 2012/0307528 A1 | 12/2012 | Humphrey et al. | |
| 2013/0082636 A1 | 4/2013 | Ohori et al. | |
| 2014/0369087 A1 | 12/2014 | Deng | |
| 2016/0268917 A1 | 9/2016 | Ramsay et al. | |

OTHER PUBLICATIONS

International Search Report and Written Opinion mailed Jul. 15, 2014 in Int'l Patent Application No. PCT/US2014/028366, 9 pages.
U.S. Appl. No. 14/645,346, "Non-Final Office Action", Aug. 18, 2016, 13 pages.
U.S. Appl. No. 14/645,355, "Non-Final Office Action", Oct. 7, 2016, 14 pages.

* cited by examiner

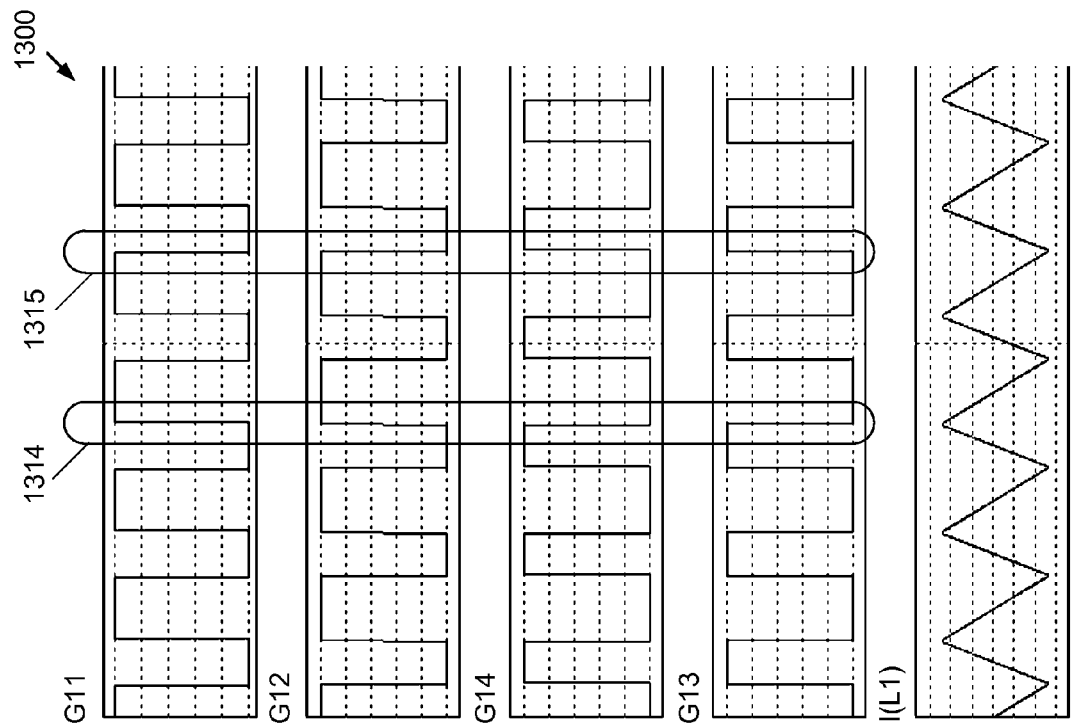
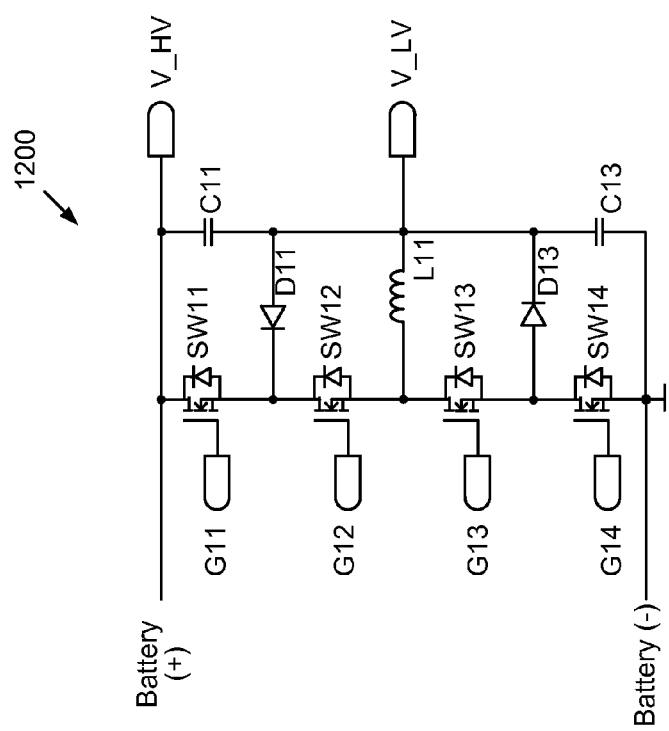
FIG. 13
FIG. 12

BIDIRECTIONAL POWER CONVERTER HAVING A CHARGER AND EXPORT MODES OF OPERATION

CROSS-REFERENCES TO RELATED APPLICATIONS

This application claims priority to U.S. Provisional Patent Application No. 61/785,786, filed Mar. 14, 2013, entitled "Bidirectional Power Converter," and U.S. Provisional Patent Application No. 61/893,017, filed Oct. 18, 2013, entitled "Bidirectional Power Converter with Input Tracker," the disclosures of which are hereby incorporated by reference in their entirety for all purposes.

BACKGROUND

Power converters operating at low line frequencies typically require the use of a bulk energy storage element to provide a stable power output. The bulk energy storage elements are typically large and expensive inductors and/or capacitors, making such bulk energy storage elements unsuitable for vehicle applications because of the material costs and physical size. Conventional power converters are also susceptible to harmonic current content that can degrade the performance of the power converter.

Embodiments of the invention address these and other problems, individually and collectively.

BRIEF SUMMARY

Embodiments of the present invention provide a bidirectional power converter that can be used in an electric vehicle to perform AC to DC power conversion to charge the electric vehicle's battery and to perform DC to AC power conversion to export power to run external electrical loads. According to some embodiments, the bidirectional power converter may include an AC interface coupled to a cyclo-inverter circuit, and a DC interface coupled to a H-bridge circuit. The cyclo-inverter can be electrically coupled to the H-bridge circuit through a transformer. The bidirectional power converter may include a neutral terminal on the AC interface that is coupled to the transformer through a filtering inductor.

In some embodiments, the bidirectional power converter may include a H-bridge circuit having a DC interface including a positive DC terminal and a negative DC terminal. The H-bridge circuit can include a first H-bridge leg coupled across the DC interface (i.e. to the positive and negative DC terminals), and a second H-bridge leg coupled across the DC interface. The first H-bridge leg can include a first switching circuit controlled by a first switching signal, and a second switching circuit coupled to the first switching circuit in series and controlled by a second switching signal. The second H-bridge leg can include a third switching circuit controlled by a third switching signal, and a fourth switching circuit coupled to the third switching circuit in series and controlled by a fourth switching signal.

In some embodiments, the bidirectional power converter may also include a cyclo-inverter circuit electrically coupled to the H-bridge circuit. The cyclo-inverter circuit may include an AC interface including a first AC line terminal and a second AC line terminal. The cyclo-inverter circuit may include a first cyclo-inverter leg including a fifth switching circuit controlled by a fifth switching signal, and a sixth switching circuit coupled to the fifth switching circuit in series and controlled by a sixth gating signal, where the first AC line terminal is coupled between the fifth switching circuit and the sixth switching circuit. The cyclo-inverter circuit may include a second cyclo-inverter leg including a seventh switching circuit controlled by the sixth gating signal, and an eight switching circuit coupled to the seventh switching circuit in series and controlled by the fifth switching signal, where the second AC line terminal is coupled between the fifth switching circuit and the sixth switching circuit.

In some embodiments, in an export mode of operation (i.e. DC to AC conversion), the first switching signal can be 180 degrees out of phase with the second switching signal, the third switching signal can be 180 degrees out of phase with the fourth switching signal, and the fifth switching signal can be 180 degrees out of phase with the sixth switching signal. The phase of the first switching signal with respect to the third switching signal can be varied to control the AC output power. The fifth switching signal can be switched synchronously (e.g., switching at the same time with the same polarity) with the first switching signal during a negative amplitude phase of an AC output, and the sixth switching signal is switched synchronously with the first switching signal during a positive amplitude phase of the AC output.

In some embodiments, in a charger mode of operation (i.e. AC to DC conversion), the duty cycles of the fifth switching signal and the sixth switching signal can be varied to control the DC output power. In the charger mode of operation, the first switching signal, the second switching signal, the third switching signal, and the fourth switching signal can be idle. The instantaneous output power on the DC interface in charger mode can be maintained to be approximately equal to the instantaneous input power on the AC interface. The switching circuits of the bidirectional power converter (e.g., the switching circuits in the cyclo-inverter) can be controlled based on a target DC bus regulation voltage instead of being based on a feedback from an actual measured DC bus voltage.

In some embodiments, the bidirectional power converter may include a DC-DC converter coupled to the DC interface of the H-bridge circuit. The DC-DC converter can be implemented, for example, as a neutral point clamped circuit controlled by a plurality of staggered switching signals (i.e. where no two switching signals in the neutral point clamped circuit are switched at the same time), or as a buck-boost circuit.

In some embodiments, the bidirectional power converter may include an AC tracker for filtering an input AC signal at the AC interface. The filtered input AC signal can be used for controlling the switching circuits of the bidirectional power converter in a charger mode of operation. The AC tracker can include a recursive filter (e.g., Kalman filter), a zero-crossing counter for determining a line frequency at the AC interface, and a coefficient update unit for updating coefficients used in the recursive filter. The coefficient update unit may update the coefficients when the line frequency shifts from a first frequency band to a second frequency band. In some embodiments, the coefficient update unit updates the coefficients of the recursive filter when changes in the line frequency satisfy a hysteresis.

In some embodiments, a process for converting power can include receiving an input power signal (e.g., can be an AC power signal or a DC power signal), and generating a power carrier signal based on the input power signal, where the power carrier signal includes alternating pulses of positive voltage and negative voltage. The process can further include modulating pulse widths of the alternating pulses in the power carrier signal, applying the modulated power carrier signal to a first winding of a transformer, and receiving the modulated power carrier signal at a second winding of the transformer. The modulated power carrier signal received at the second winding of the transformer can be rectified to generate an output power signal. When the input power signal is an input AC power signal, the output power signal is a output DC power signal, and when the input power signal is an input DC power signal, the output power signal is an output AC power signal.

In some embodiments, when the input power signal is an input DC power signal, the modulated power carrier signal may not include a line frequency component of the output AC power signal. In some embodiments, when the input power signal is an input AC power signal, the process for converting power can further include receiving the input AC power signal at a recursive filter, determining a frequency of the input AC power signal, correlating the determined frequency to a frequency band, and updating coefficients of the recursive filter based on the frequency band. In some embodiments, correlating the determined frequency to a frequency band can be based on a hysteresis.

BRIEF DESCRIPTION OF THE DRAWINGS

FIG. 12 illustrates a circuit diagram of a bidirectional DC-DC converter according to some embodiments.

FIG. 13 illustrates a switching waveform of a bidirectional DC-DC converter according to some embodiments.

DETAILED DESCRIPTION

Embodiments of the present invention provide a bidirectional power converter that can be used in an electric vehicle to perform AC to DC power conversion to charge the electric vehicle's battery and to perform DC to AC power conversion to export power to run external electrical loads. The bidirectional power converter according to some embodiments can provide at least 15 kW of power in either conversion direction, and eliminates the need of bulk energy storage elements that are typically present between power stages of conventional high power converters. Bulk energy storage elements in conventional converters are typically sized in relation to line frequency. For typical line frequencies in the 60 Hz range, the bulk energy storage elements are typically large and expensive inductors and/or capacitors, making such bulk energy storage elements unsuitable for vehicle applications because of the material costs and physical size. For example, for a conventional 15 kW power converter, a 6000 uF bulk energy storage capacitor, which may have a physical size of about 12 inches by 8 inches by 4 inches, may be needed. Embodiments of the present invention eliminates the need for such bulk energy storage elements.

Figure 1:
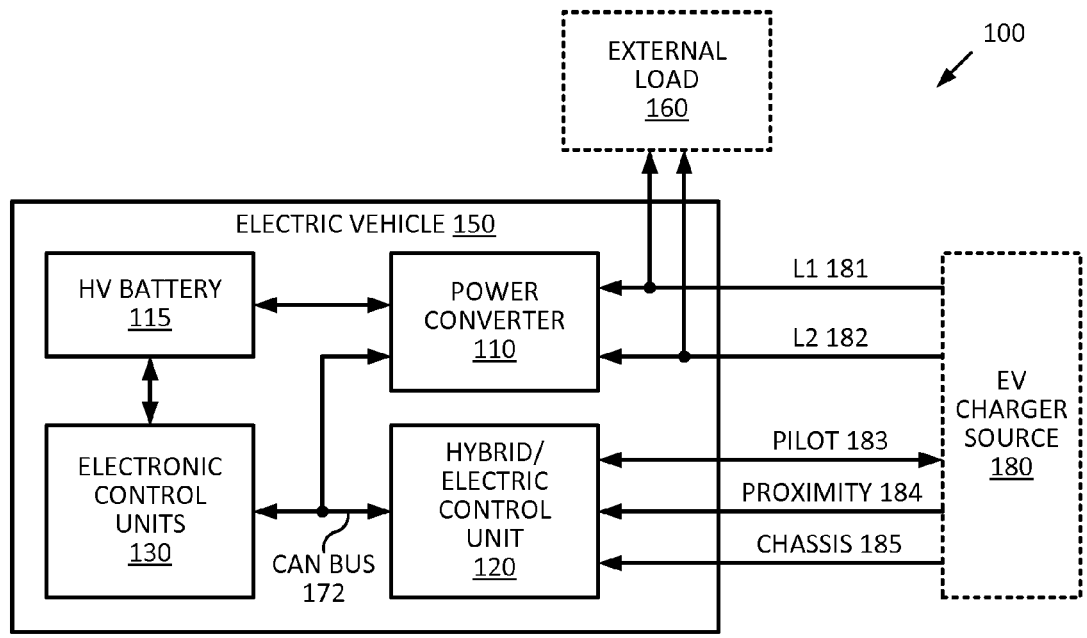
FIG. 1 illustrates a block diagram of an electric vehicle power system according to some embodiments.

FIG. 1 illustrates a block diagram of an electric vehicle (EV) power system 100 according to some embodiments. Electric vehicle 150 includes a bidirectional power converter 110 coupled to a high voltage battery 115, one or more electronic control units 130, and a hybrid-electric control unit 120. Electric vehicle 150 can be a plug-in hybrid vehicle that powers its drivetrain using a combination of high voltage battery 115 and a combustion-based engine, a fuel cell hybrid vehicle that powers its drivetrain using a combination of high voltage battery 115 and a fuel cell, a plug-in electric vehicle that powers its drivetrain using only high voltage battery 115, or other types of electric vehicle that can power its drivetrain from high voltage battery 115.

High voltage battery 115 is a rechargeable battery that can provide sufficient energy to power a vehicle. High voltage battery 115 can delivery hundreds of volts (e.g., greater than 100 volts) as compared to standard car batteries that typically only deliver 12 or 24 volts. High voltage battery 115 may include any number of battery modules arranged in series or other topologies, and can be made of nickel metal hydride, lithium ion, cobalt dioxide, nickel-cobalt-manganese, nickel-cobalt-aluminum, manganese oxide, or other suitable materials that can be used to stored electrical energy to power a vehicle.

Electronic control units (ECU) 130 can include one or more vehicle control modules such as engine control module, powertrain control module, as well as other control modules to control a vehicle's systems such as the vehicle's transmission, braking system, power steering, etc. Hybrid-electric control unit 120 controls the vehicle's power delivery system such as switching between the use of high voltage battery 115 and an alternative power source (e.g., combustion engine, fuel-cell, etc.). Hybrid-electric control unit 120 can be communicatively coupled to ECU 130 through a vehicle's CAN bus (controller area network bus) to receive vehicle information such as driving conditions and driver input. Hybrid-electric control unit 120 is also communicatively coupled to high voltage battery 115 (e.g., directly, or via ECU 130 as shown, or through a vehicle's other communication systems), and can monitor the battery's performance and charge level to control charging of high voltage battery 115.

An external power source such as EV charger 180 can be used to charge high voltage battery 115. In some embodiments, EV charger 180 can be a SAE J1772 compliant charger and can provide two different charging levels, Level 1 and Level 2, to charge electric vehicle 150. EV charger 180 can provide a 120 Volt, single phase, 16 Amp peak current AC supply on the L1 181 terminal to provide Level 1 charging, or prove a 240 Volt, split phase, 80 Amp peak current AC supply on L2 182 terminal to provide Level 2 charging. EV charger 180 may also include control signals such as a control pilot signal 183 to communicate with hybrid-electric control unit 120 to coordinate charging level between high voltage battery 114 and EV charger 180, as well as a proximity detection signal 184 that can be used by electric vehicle 150 to detect the presence of and connectivity to EV charger 180. A chassis signal 185 can provide a common ground connection for the electric vehicle 150 and EV charger 180.

According to some embodiments, bidirectional power converter 110 can be coupled to high voltage battery 115, and can be operated in a charger mode to convert AC power from an external supply (e.g., power from EV charger 180) into DC power to charge high voltage battery 115, or an export mode to convert DC power from high voltage battery 115 to AC power for delivery to one or more external loads 160. The operating mode of bidirectional power converter 110 can be configured by ECU 130 (e.g., through CAN bus 172) or by hybrid-electric control unit 120. In some embodiments, the operating mode can be configured by bidirectional power converter 110 itself based on user input selecting the appropriate operating mode, or based on whether an external power source or an external load is connected to bidirectional power converter 110.

It should be understood that the term "external load" refers to a load that is external to bidirectional power converter 110, and not necessarily external to electric vehicle 150. In some embodiments, external load 160 can include an electrical system (e.g., an appliance, tools, equipment, etc.) that is configured to run on AC power and is external to electric vehicle 150 as shown in FIG. 1. Such an external load can be plugged into electric vehicle 150 to draw power from high voltage battery 115. In some embodiments, external load 160 can be the power grid, and the high voltage battery 115 can be used to compensate power to the grid during peak usage time. In other embodiments, the external load 160 can include an electrical system that is integrated as part of electric vehicle 150 (e.g., any electrical system of electric vehicle 150 that runs on AC power).

The input and output power levels and capabilities of bidirectional power converter 110 in either mode of operation can be adapted for use in different vehicles that may have different high voltage battery specifications and/or use different types of EV chargers (e.g., chargers in different countries that provide different power supplies). According to an exemplary embodiment of bidirectional power converter 110, in the charger mode of operation, bidirectional power converter 110 can receive an input AC voltage up to approximately 90-265 Volts and input AC currents of up to approximately 70 Amps at approximately 208-240 Volts, or up to approximately 16 Amps at approximately 120 Volts. Input line frequency in the range of approximately 47-63 Hz can be used, and a power factor of greater than 0.98 can be achieved. These exemplary input specifications are compatible with the Level 1 and Level 2 charging capabilities of SAE J1772 compliant chargers. In the exemplary embodiment, bidirectional power converter 110 can provide an output DC voltage up to approximately 450-750 Volts, and can provide an output current up to approximately 31 Amps at approximately 450 Volts average and 38 RMS, yielding an output power of approximately 14-15 kW.

According to an exemplary embodiment, bidirectional power converter 110 in the export mode of operation can receive an input DC voltage up to approximately 450-750 Volts and an input DC current up to approximately 36 Amps. The exemplary embodiment of bidirectional power converter 110 can provide continuous dual output AC currents up to approximately 60 Amps at approximately 120 Volts, or up to approximately 60 Amps at approximately 240 Volts with less than 3% sinusoidal wave distortion at approximately 60 Hz, yielding an output AC power of approximately 14-15 kW. The exemplary embodiment of bidirectional power converter 110 can also provide a neutral output rated at approximately 40 Amps, which can be used to compensate for unbalanced loads.

In either mode of operation, bidirectional power converter 110 can provide a power efficiency of greater than 90%, and can also provide 2500 Volts of input to ground and input to output voltage insulation, and short circuit and over temperature protection. It should be understood that the input and output specifications of bidirectional power converter 110 described above are illustrative and not restrictive, and that other embodiments of bidirectional power converter 110 can have other input and/or output specifications, tolerances, and/or capabilities.

Figure 2:
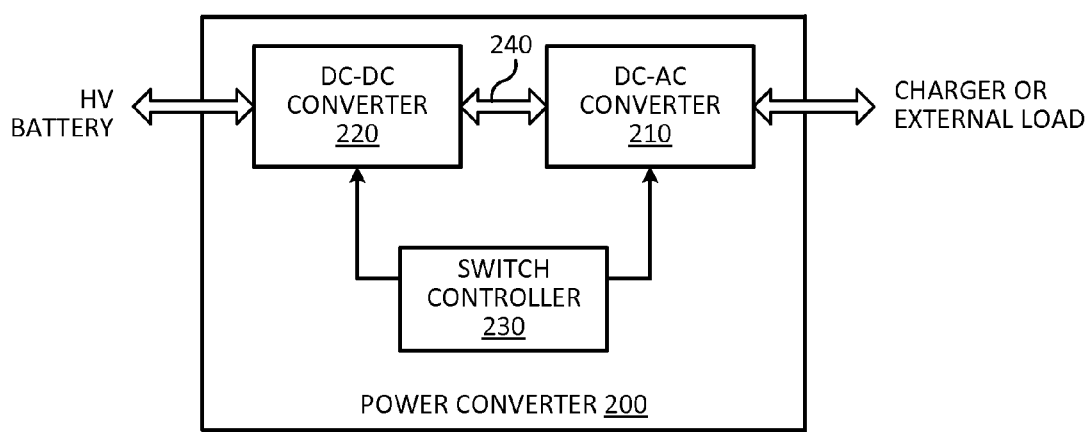
FIG. 2 illustrates a block diagram of a bidirectional power converter according to some embodiments.

FIG. 2 illustrates a block diagram of a bidirectional power converter 200 according to some embodiments. Bidirectional power converter 200 includes a power path 240 that is used to provide power between a DC source or load such as high voltage battery 115, and an AC source or load such as EV charger 180 or external load 160, respectively. Bidirectional power converter 200 includes AC-DC converter 210 (may also be referred to as a DC-AC converter due to its bidirectional capabilities) coupled to DC-DC converter 220. In some embodiments, AC-DC converter 210 can be implemented as H-bridge and cyclo-inverter, and DC-DC converter 220 can be implemented as a buck-boost or neutral point clamp converter. Bidirectional power converter 200 can also include a switch controller 230 that is used to control the switching circuits in AC-DC converter 210 and DC-DC converter 220. Based on the input power characteristics and the desired output power characteristics in either direction, switch controller 220 can be programmed to control AC-DC converter 210 and DC-DC converter 220 accordingly.

Switch controller 230 can be implemented with one or more programmable logic devices (PLD) such as programmable logic array or array logic devices (PLAs/PALs), complex programmable logic devices (CPLDs), and/or field programmable gate array devices (FPGAs). In some embodiments, switch controller 230 can be implemented with one or more data processing devices such as microprocessors or microcontroller that are coupled to a memory storing computer readable code for performing the functionalities of switch controller 230.

A unique feature of bidirectional power converter 200 according to some embodiments is the ability to operate in either operating modes (charger mode, or export mode) without the need for a large DC bus capacitor. The elimination of a large bulk energy storage component significantly reduces size and cost of the system. However, in order to operate in charger mode while maintaining high power factor on the input AC power and without incorporating an overly complicated control algorithm, the ripple voltage on the intermediate DC bus between the converter stages must remain relatively low. To achieve this, the instantaneous output power on the DC terminals, according to some embodiments, can be maintained to be approximately equal to the instantaneous AC input power (e.g., within 1%, 2%, 5%, etc.). To actively control this power balance would typically require significant complexity and risk stability problems in conventional control systems. Embodiments of the present invention uses an improved control method that is simple to implement and easy to ensure stable operation.

According to some embodiments, the AC-DC converter stage utilizes the target DC bus regulation voltage in its switching duty cycle calculation algorithm instead of relying on the feedback of the actual measured DC bus voltage to minimize ripples on the DC bus. In some embodiments, the input AC line frequency can also be monitored. In addition, the DC-DC converter stage also uses the target DC bus regulation voltage instead of relying on the feedback of the actual measured DC bus voltage in its duty cycle calculations. The result is that the actual DC bus voltage self-regulates near the target DC bus voltage level without the need for a complicated control system. In some embodiments, bidirectional power converter 200 can be operated without the addition of a sensor for measuring the DC bus voltage as opposed to what is used in conventional power converters. The DC-DC converter section operates with a switching duty cycle calculation based on the charge level of the high voltage battery and the target DC bus voltage. As the DC bus voltage begins to rise, the bidirectional power converter according to embodiments of the invention will instantly begin drawing more current from the DC bus, and thus holding the DC bus voltage to the desired target regulation level. This operating condition maintains the DC bus to having low ripples when powering a low impedance battery load, and thus eliminating the need of bulk storage elements. The DC-DC converter automatically draws the appropriate rectified sinusoidal wave current pulses from the bus to match the same currents that are being supplied to the bus by the power factor correction of the AC-DC converter stage without the need for a complicated current control system.

Figure 3:
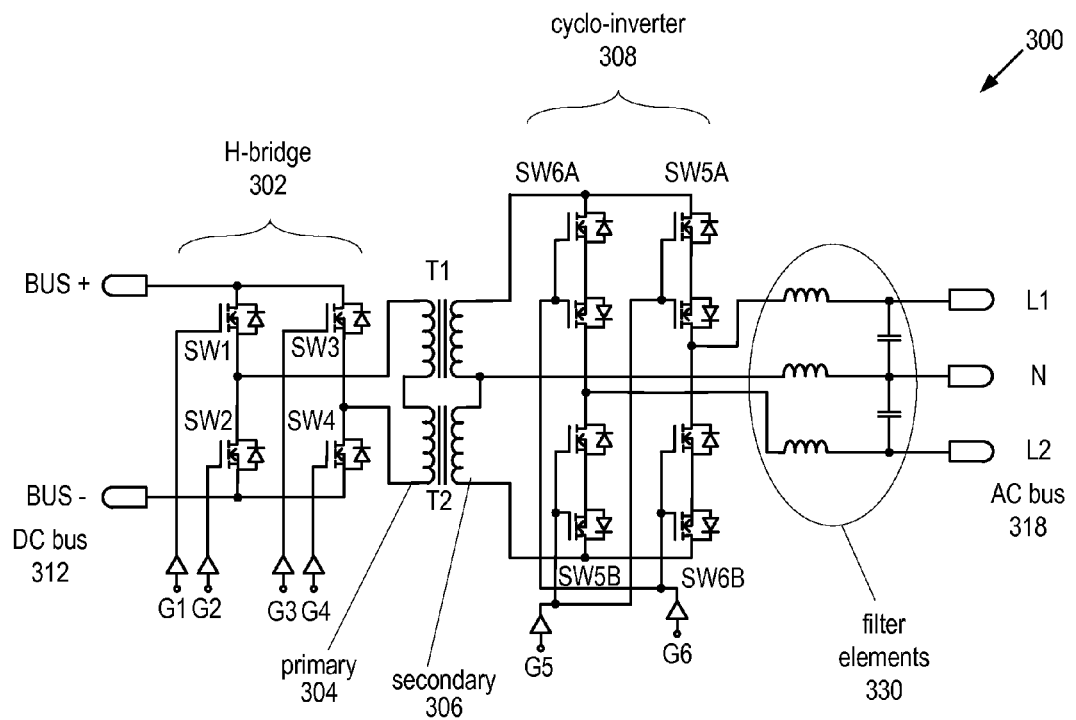
FIG. 3 illustrates a circuit diagram of a bidirectional AC-DC converter according to some embodiments.

FIG. 3 illustrates an AC-DC converter 300 that can be used in a bidirectional power converter 200 according to some embodiments of the invention. AC-DC converter 300 includes a H-bridge section 302 that is coupled to a DC bus 312, and a cyclo-inverter section 308 that is coupled to an AC bus 318. H-bridge section 302 can be electrically coupled to cyclo-inverter section 308 through a galvanic isolation such as one or more transformers. In some embodiments, two transformers T1 and T2 can be used as shown in FIG. 3. The one or more inductive elements on the side of H-bridge section 302 are collectively referred to as the transformer primary 304, and the one or more inductive elements on the side of cyclo-inverter section 308 are collectively referred to as the transformer secondary 306. The transformer windings provided in transformer primary 304 and transformer secondary 308 can be the same to reduce transformer losses, although transformer primary 304 and transformer secondary 308 can have different number of transformer windings. In other embodiments, a single transformer T1 can be used instead. In cases where H-bridge section 302 and cyclo-inverter section 308 share a common ground connection, the use of any transformers can be eliminated.

H-bridge section 302 includes switching circuits SW1, SW2 SW3, and SW4. Each or any of switching circuits SW1, SW2, SW3, and SW4 can be implemented using a transistor switch such as a FET (e.g., MOSFET, as shown), a BJT, a IGBT, or other suitable types of switching element. Each or any of switching circuits SW1, SW2 SW3, and SW4 may further include a diode coupled in parallel with the transistor switch. The diode can be arranged with the anode terminal of the diode towards the negative terminal of DC bus 312 and the cathode terminal of the diode towards the positive terminal of DC bus 312.

H-bridge section 302 has a first leg that includes switching circuits SW1 and SW2 coupled in series. A first terminal of switching circuit SW1 is coupled to the positive terminal of DC bus 312, and a second terminal of switching circuit SW2 is coupled to switching circuit SW2 and to a first terminal of transformer primary 304. Switching circuit SW1 is controlled by gate signal G1. A first terminal of switching circuit SW2 is coupled to switching circuit SW1 and to the first terminal of transformer primary 304, and a second terminal of switching circuit SW2 is coupled to the negative terminal of DC bus 312. Switching circuit SW2 is controlled by gate signal G2. The term "gate signal" and "switching signal" may be used interchangeably herein.

H-bridge section 302 also has a second leg that includes switching circuits SW3 and SW4 coupled in series. A first terminal of switching circuit SW3 is coupled to the positive terminal of DC bus 312, and a second terminal of switching circuit SW3 is coupled to switching circuit SW4 and to a second terminal of transformer primary 304. Switching circuit SW3 is controlled by gate signal G3. A first terminal of switching circuit SW4 is coupled to switching circuit SW3 and to the second terminal of transformer primary 304, and a second terminal of switching circuit SW4 is coupled to the negative terminal of DC bus 312. Switching circuit SW4 is controlled by gate signal G4.

Cyclo-inverter 308 includes switching circuits SW5A, SW5B, SW6A, and SW6B. Each or any of switching circuits SW5A, SW5B, SW6A, and SW6B includes two switches coupled in series. Each or any of the switches can be implement as a transistor switch such as a FET (e.g., a MOSFET, as shown), a BJT, a IGBT, or other suitable types of switching element. Each or any of the switches may further include a diode coupled in parallel with the transistor switch. In each of switching circuits SW5A, SW5B, SW6A, and SW6B, the diodes can be arranged such that the anode terminals of the respective diodes of the two switches are coupled together at an internal connection node, and the cathode terminals of the respective diodes of the two switches are arranged in opposing directions.

Cyclo-inverter section 308 has a first leg that includes switching circuits SW5A and SW6B coupled in series. A first terminal of switching circuit SW5A is coupled to a first terminal of the transformer secondary 306, and a second terminal of switching circuit SW5A is coupled to switching circuit SW6B and to a first line terminal L1 of AC bus 318. Switching circuit SW5A is controlled by gate signal G5. A first terminal of switching circuit SW6B is coupled to switching circuit SW5A and to the first line terminal L1 of AC bus 318, and a second terminal of switching circuit SW6B is coupled to a second terminal of transformer secondary 306. Switching circuit SW6B is controlled by gate signal G6.

Cyclo-inverter section 308 also has a second leg that includes switching circuits SW6A and SW5B coupled in series. A first terminal of switching circuit SW6A is coupled to the first terminal of the transformer secondary 306, and a second terminal of switching circuit SW6A is coupled to switching circuit SW5B and to the second line terminal L2 of AC bus 318. Switching circuit SW6A is controlled by gate signal G6. A first terminal of switching circuit SW5B is coupled to switching circuit SW6A and to the second line terminal L2 of AC bus 318, and a second terminal of switching circuit SW5B is coupled to a second terminal of transformer secondary 306. Switching circuit SW5B is controlled by gate signal G5.

Cyclo-inverter section 308 also provides that a neutral terminal N of AC bus 318 is coupled to the transformer secondary 306. In the embodiment as shown which includes two transformers T1 and T2, the neutral terminal N of AC bus 318 can be coupled to the node connecting the respective inductive elements of T1 and T2 on the transformer secondary 306 as shown. In embodiments in which only one transformer is used, the neutral terminal N of AC bus 318 can be coupled to the second terminal of the transformer secondary 306. Each terminal of AC bus 318 (L1, L2, or N) can also include a filtering inductor coupled in-line with the respective terminal. AC bus 318 may also include a filtering capacitor coupled between L1 and N, and between L2 and N, as shown.

The operation of AC-DC converter 300 will now be described in more details. The export mode of operation (DC to AC conversion) will be described first, followed by a description of charger mode of operation (AC to DC conversion).

In the export mode of operation, the H-bridge section 302 is operated as a phase-shift converter which converts the DC voltage applied across the positive and negative terminals of DC bus 312 to a stream of high frequency square wave voltage pulses which are then fed to the transformer primary 304 windings. Gate signals G1, G2, G3, and G4 are applied to the respective switch circuits SW1, SW2, SW3, and SW4 in the H-bridge section 302 to generate a square wave voltage with a controllable duty cycle. Gate signals G1 and G2 are 180 degrees out of phase such that only one of switching circuits SW1 or SW2 in the first leg of H-bridge section 302 is turned on or closed at a time. Gate signals G3 and G4 are 180 degrees out of phase such that only one of switching circuits SW3 or SW4 in the second leg of H-bridge section 302 is turned on or closed at a time. The phase of the switching signals on one leg of the H-bridge section 302 is varied with respect to the other leg from between 0 degrees (no overlap) to 180 degrees (full overlap) to control the duty cycle of the generated square wave between 0% and 100%. The switch controller generates the gate signals in a manner to vary this duty cycle in a rectified sinusoidal pattern where the sinusoidal frequency is the intended AC line frequency of the desired AC output line voltage, and the modulation depth (percentage amount that the duty cycle is allowed to approach 100%) is used to control the amplitude of the resulting AC output line voltage.

Synchronous to this switching action on the H-bridge section 302, gate signals G5 and G6 are generated to control the cyclo-inverter section 308 in a cooperative manner to rectify the high frequency switching square wave voltage which appears at the transformer secondary 306. During the intended positive half of the resulting AC output line voltage, the rectification polarity is steered to produce a positive voltage when averaged by the output filter. A logic inversion occurs in the rectification process corresponding to a zero crossing in the sinusoidal AC output to allow a negative voltage to be produced during the negative half of the resulting AC output line voltage.

During the power conversion process, no line frequency component of the AC output power appears in the voltage pattern applied to the transformer primary 304. Instead, power is transferred by high frequency carrier through modulation of the switching signals. In some embodiments, the high frequency carrier can have a frequency that is at least 100, 200, 500, 600 times, or greater than the AC output line frequency. For example, in some embodiments, the AC output may have a line frequency of approximately 60 Hz, and power can be transferred by a high frequency carrier of approximately 40 kHz such that no line frequency component of the AC output is applied to the transformer. This can be demonstrated by averaging the transformer primary voltage over a half cycle of the AC output line frequency and observing that the average is zero. This feature allows the use of small, light, and low cost transformers to be used without saturating the transformers because only high frequency power flow is occurring. The high frequency switching events also allows energy from leakage inductance in the transformer to be recovered.

The converter is also capable of being fully loaded in an unbalanced manner. This means that 100% rated load can be applied between either L1 and N terminals or between L2 and N terminals while the other output (either L1-N or L2-N) can remain at 0% rated load. This is possible due to the addition of an inductor which ties the output neutral point to a center tap, for example, at the common point of the series connected secondary windings of the two transformers T1 and T2.

Figure 4:
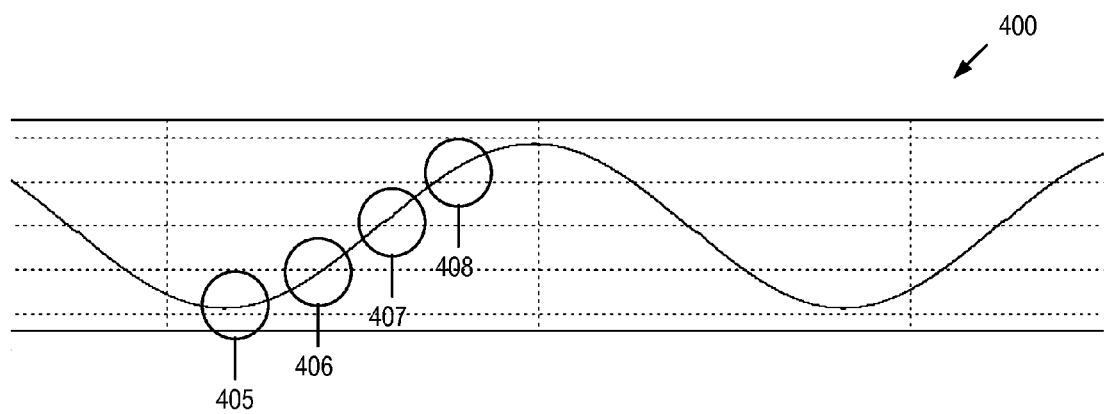
FIG. 4 illustrates an AC output waveform of a bidirectional AC-DC converter according to some embodiments.

FIG. 4 illustrates the sinusoidal AC output waveform 400 on either of line terminals L1 or L2 of AC bus 318 in the export mode of operation, according to some embodiments. The sinusoidal AC output can be, for example, at or near 60 Hz. In some embodiments, the AC output waveform on line terminal L1 is in phase with line terminal L2, allowing the two line terminals L1 and L2 to each output a split single phase voltage that can be combined to double the output amplitude (e.g., two 120 Volts AC outputs on respective line terminals L1 and L2 can be combined to generate a 240 Volts AC output).

Figure 5:
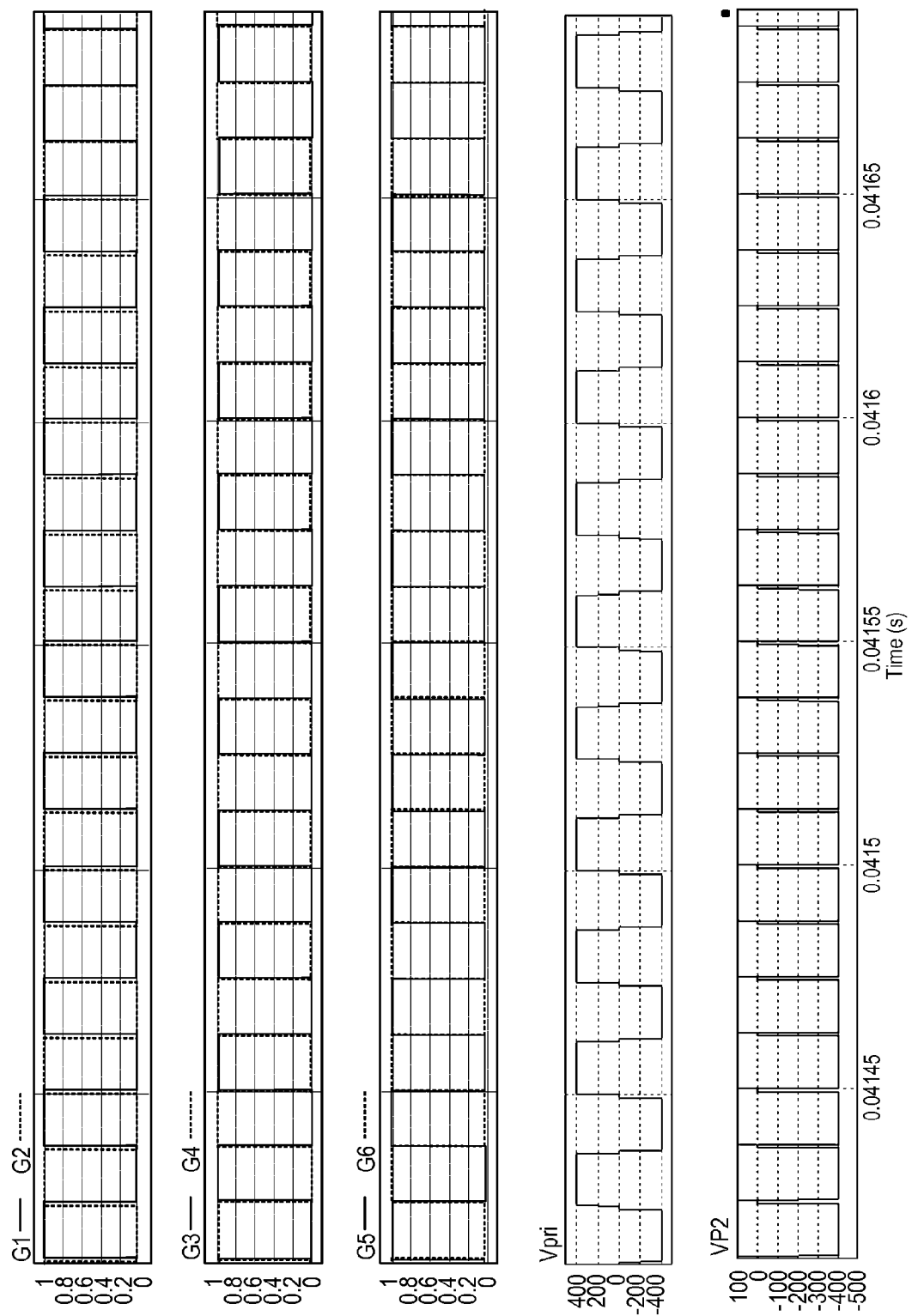
FIG. 5 illustrates a first phase of a switching waveform of a bidirectional AC-DC converter according to some embodiments.

Four regions in the sinusoidal AC output waveform 400 are highlighted to illustrate the switching scheme to generate the resulting AC output. The first region 405 is near the negative peak of the AC output waveform 400. The second region 406 is near the negative 50% peak of the AC output waveform 400. The third region 407 is near the zero crossing of AC output waveform 400. The fourth region 408 is near the positive 50% peak of AC output waveform 400. The switching events corresponding to these regions are illustrated in FIG. 5 though FIG. 8. In FIG. 5 through FIG. 8, Vpri shows the signal generated by the H-bridge section 302 that is applied to the transformer primary 304. VP2 shows the rectifier output voltage in the cyclo-inverter section 308 prior to filtering. According to some embodiments, the gate signals G1-G6 are switched at approximately 40 kHz.

FIG. 5 illustrates the switching events corresponding to the first region 405 near the negative peak of the AC output waveform 400, according to some embodiments. As illustrated, near the negative peak of the AC output waveform 400, the switching events on the two legs of H-bridge section 302 (gate signals G1-G4) provides gate signal G1 in phase with gate signal G4 and 180 degrees out of phase with gate signal G3, and gate signal G2 in phase with gate signal G3 and 180 degrees out of phase with gate signal G4. This generates a high frequency approximate square wave Vpri with positive voltage pulse widths at approximately 50% duty cycle and negative voltage pulse widths at approximately 50% duty cycle. The switching events in the cyclo-inverter section 308 (gate signals G5-G6) rectifies the high frequency Vpri square wave to generate VP2 with negative voltage pulses at twice the frequency of Vpri, and having a negative pulse widths approaching 100% duty cycle. The negative voltage pulses are filtered to generate the peak negative voltage of the AC output waveform 400.

Figure 6:
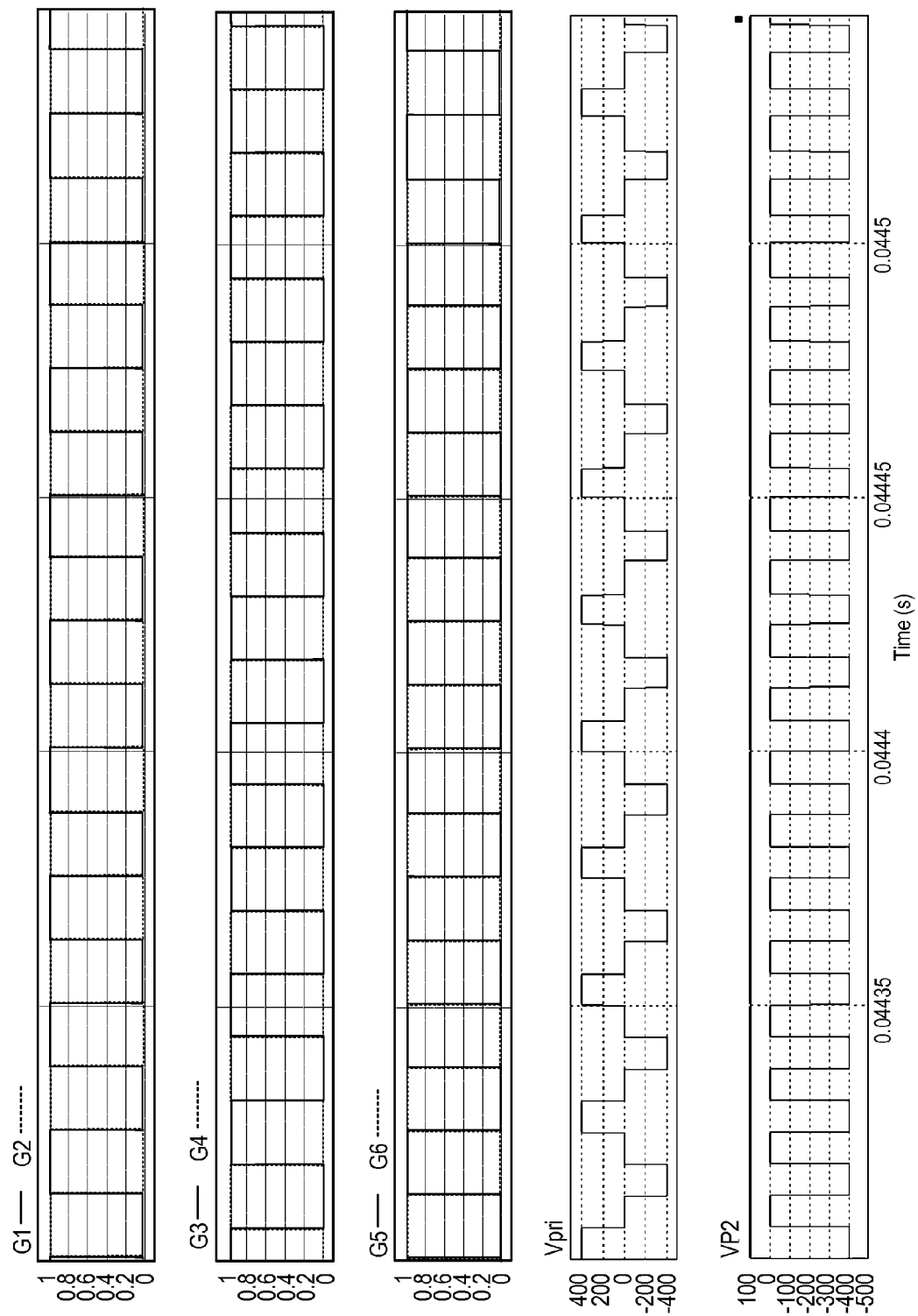
FIG. 6 illustrates a second phase of a switching waveform of a bidirectional AC-DC converter according to some embodiments.

FIG. 6 illustrates the switching events corresponding to the second region 406 near the negative 50% peak of the AC output waveform 400, according to some embodiments. As illustrated, near the negative 50% peak of the AC output waveform 400, the switching events on the two legs of H-bridge section 302 (gate signals G1-G4) are about 90 degrees out of phase to generate a high frequency step wave Vpri with positive voltage pulse widths at approximately 25% duty cycle and negative voltage pulse widths at approximately 25% duty cycle. The switching events in the cyclo-inverter section 308 (gate signals G5-G6) rectifies the high frequency step wave Vpri to generate VP2 with negative voltage pulses at twice the frequency of Vpri with negative pulse widths approaching 50% duty cycle. The negative voltage pulses are filtered to generate the 50% peak negative voltage of the AC output waveform 400.

Figure 7:
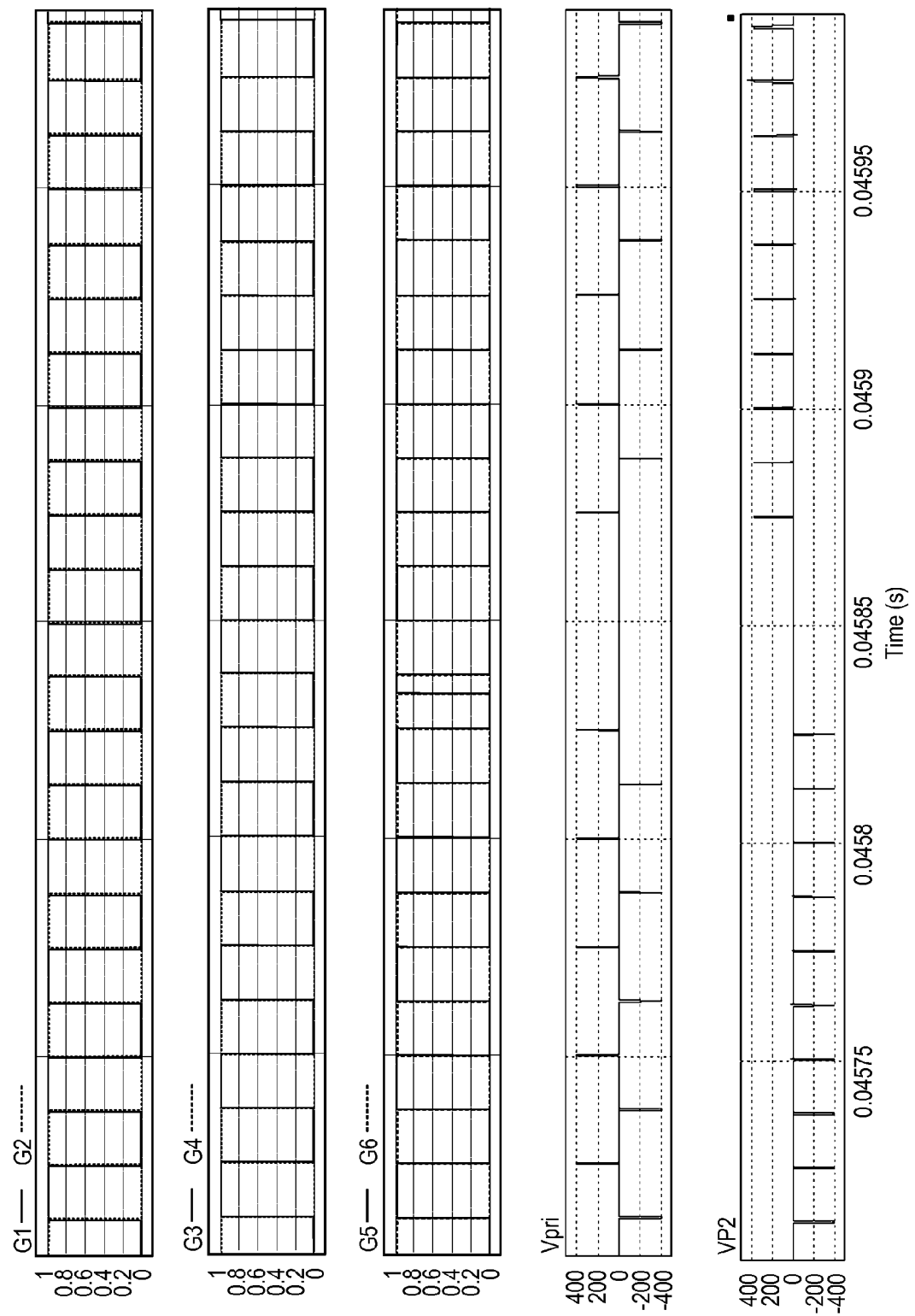
FIG. 7 illustrates a third phase of a switching waveform of a bidirectional AC-DC converter according to some embodiments.

FIG. 7 illustrates the switching events corresponding to the third region 407 near the zero crossing of the AC output waveform 400, according to some embodiments. As illustrated, near zero crossing of the AC output waveform 400, the switching events on the two legs of H-bridge section 302 (gate signals G1-G4) provides gate signal G1 in phase with gate signal G3 and 180 degrees out of phase with gate signal G4, and gate signal G2 in phase with gate signal G4 and 180 degrees out of phase with gate signal G3. This generates a high frequency pulse wave Vpri with alternating positive voltage pulses and negative voltage pulses with narrow pulse widths. Before the zero crossing of the AC output waveform 400, the switching events in the cyclo-inverter section 308 (gate signals G5-G6) rectifies the high frequency pulse wave Vpri to generate VP2 with narrow negative voltage pulses at twice the frequency of Vpri. During the negative amplitude portion of the AC output, switching signal G5 is switched synchronously at the same polarity with switching signal G1. At about the zero crossing of the AC output waveform 400, an inversion of the rectification logic occurs in switching signals G5 and G6. During the positive amplitude portion of the AC output, switching signal G6 becomes the switching signal that is switched synchronously at the same polarity with switching signal G1 due to the inversion at the zero crossing. This inversion allows for the unfolding (or un-rectification) of the rectified sinusoidal modulating pattern being applied to the phase shift bridge, resulting in the polarity shift of the VP2 voltage. After the zero crossing of the AC output waveform 400, the switching events in the cyclo-inverter section 308 (gate signals G5-G6) rectifies the high frequency pulse wave Vpri to generate VP2 with narrow positive voltage pulses at twice the frequency of Vpri. This corresponds to the amplitude midpoint crossing of the AC output waveform 400.

Figure 8:
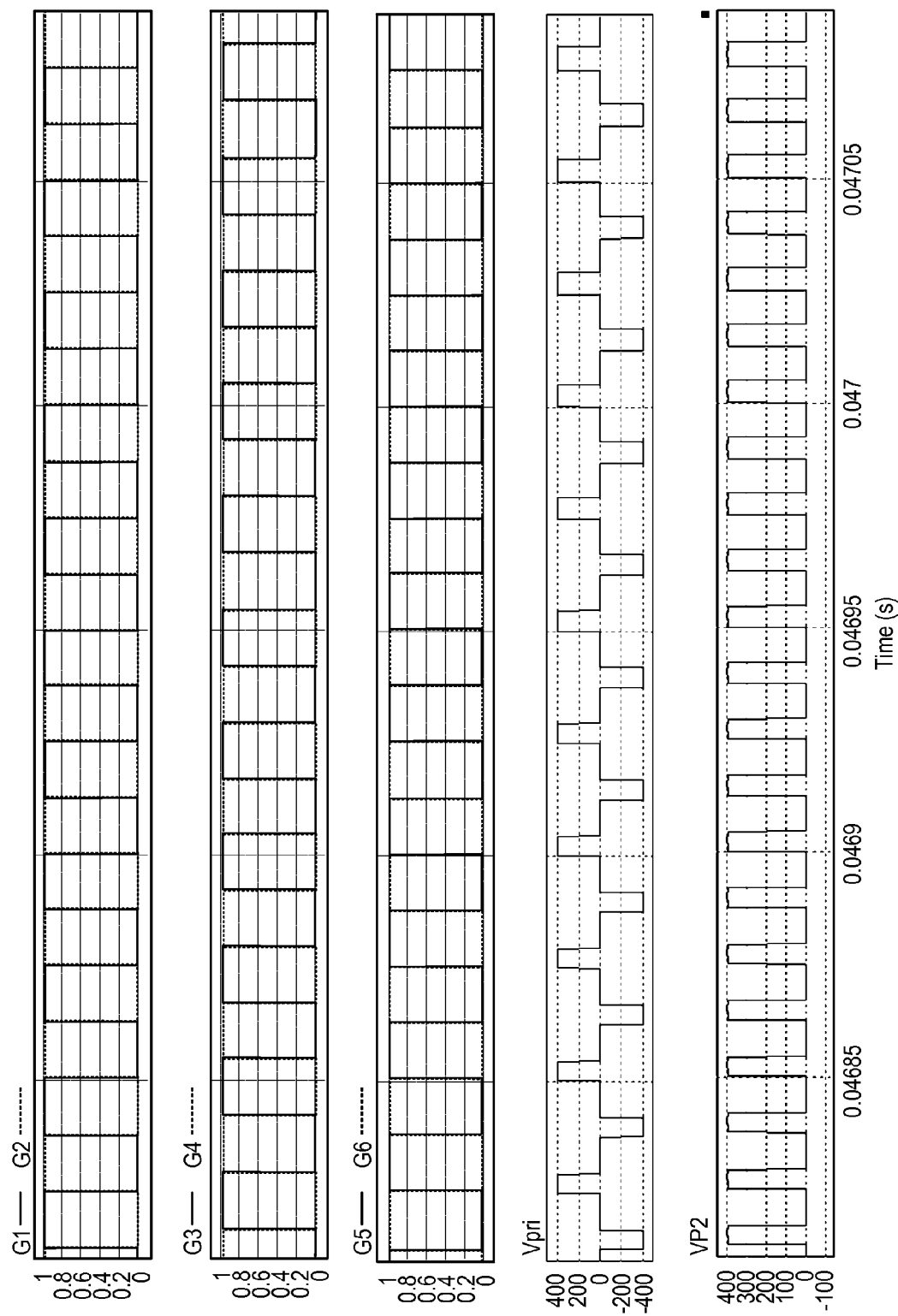
FIG. 8 illustrates a fourth phase of a switching waveform of a bidirectional AC-DC converter according to some embodiments.

FIG. 8 illustrates the switching events corresponding to the fourth region 408 near the positive 50% peak of the AC output waveform 400, according to some embodiments. As illustrated, near the positive 50% peak of the AC output waveform 400, the switching events on the two legs of H-bridge section 302 (gate signals G1-G4) are about 90 degrees out of phase to generate a high frequency step wave Vpri with positive voltage pulse widths at approximately 25% duty cycle and negative voltage pulse widths at approximately 25% duty cycle. The switching events in the cyclo-inverter section 308 (gate signals G5-G6) rectifies the high frequency step wave Vpri to generate VP2 with positive voltage pulses at twice the frequency of Vpri, and having positive pulse widths of approaching 50% duty cycle. The positive voltage pulses are filtered to generate the 50% peak positive voltage of the AC output waveform 400.

The peak positive voltage of the AC output waveform 400 is generated in a similar manner by controlling the duty cycle of Vpri, rectifying Vpri to generate VP2 having positive pulse widths approaching 100% duty cycle, and filtering VP2 to generate the peak positive voltage of the AC output waveform 400. The above processes are performed in reverse to generate the downward sloping portion of the sinusoidal AC output waveform 400, and the entire process is repeated to generate the sinusoidal AC output.

In the charger mode of operation, an AC input is provided on either or both line terminals L1 or L2 of AC bus 318. Cyclo-inverter section 308 operates to generate a step or square wave that is applied to transformer secondary 306. The resulting step or square wave appearing on transformer primary 304 is rectified to generate a steady DC current with minimal ripple. A steady DC current can be provided regardless of the instantaneous phase of the AC input, and steady DC power can be supplied regardless of the voltage differential between the instantaneous value of the AC input voltage and the desired DC output voltage. The duty cycle of the step or square wave generated by cyclo-inverter section 308 is controlled and adjusted to allow power be drawn from the AC input with low harmonic current content and high power factor.

Figure 9:
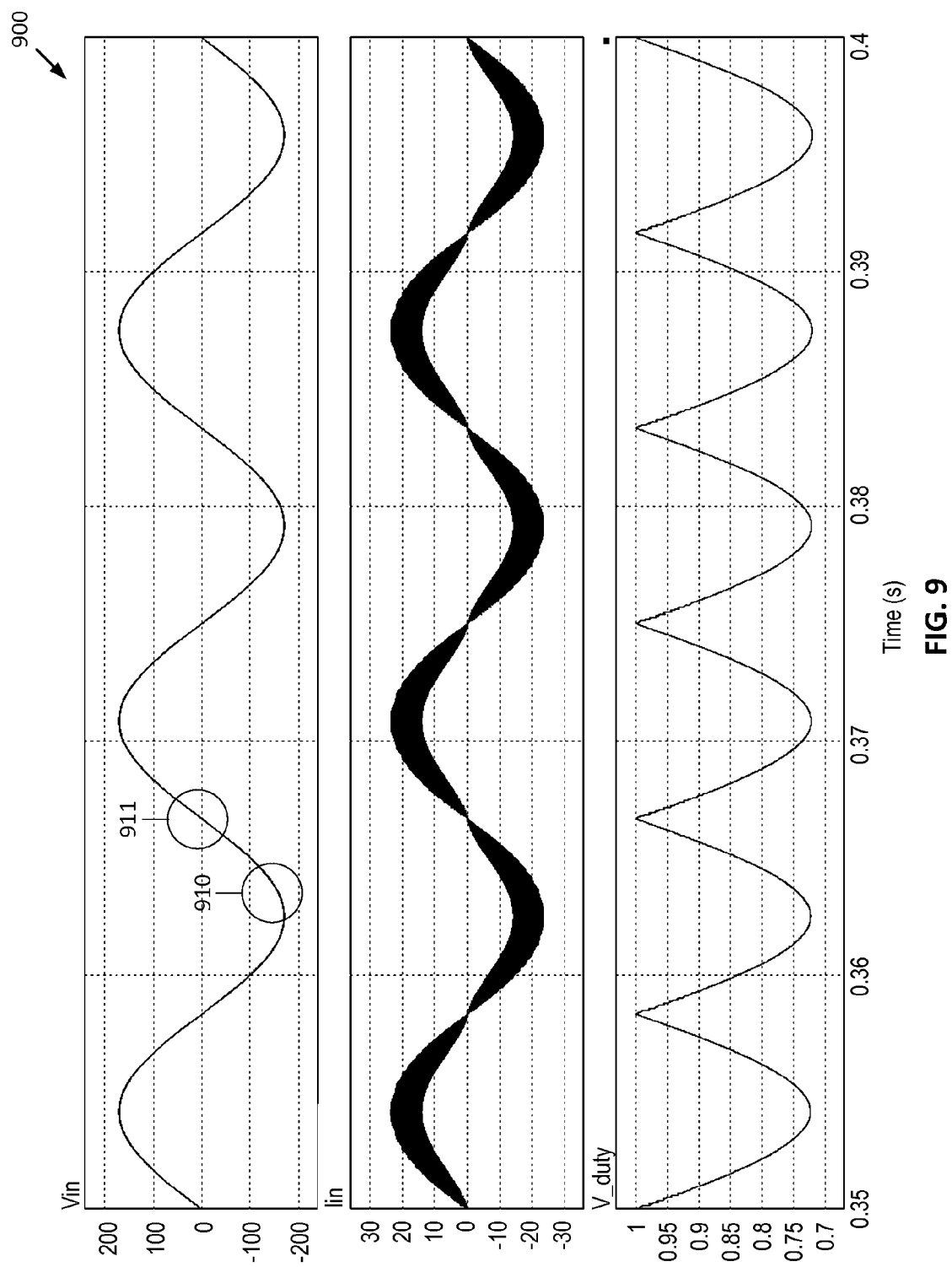
FIG. 9 illustrates an AC input waveform of a bidirectional AC-DC converter according to some embodiments.

FIG. 9 illustrates the AC input waveform 900 that can be provided on either of line terminals L1 or L2 of AC bus 318 in the charger mode of operation, along with the input inductor current Iin and the duty cycle V_duty of gate signals G5 and G6, according to some embodiments. The AC input is approximately 60 Hz, and can be in the range of approximately 47-63 Hz in some embodiments. The general shape of the duty cycle V_duty of switching signals G5 and G6 in the charger mode of operation is that of an inverted, rectified sinusoid as shown (V_duty) to control the overlap time of the switching circuits in cyclo-inverter section 308. The modulation depth of the duty cycle will increase as the ratio of the AC input voltage to the DC output voltage decreases. Additional control loop factors can be considered with the calculated duty cycle to control the harmonic current content and the power factor.

Figure 10:
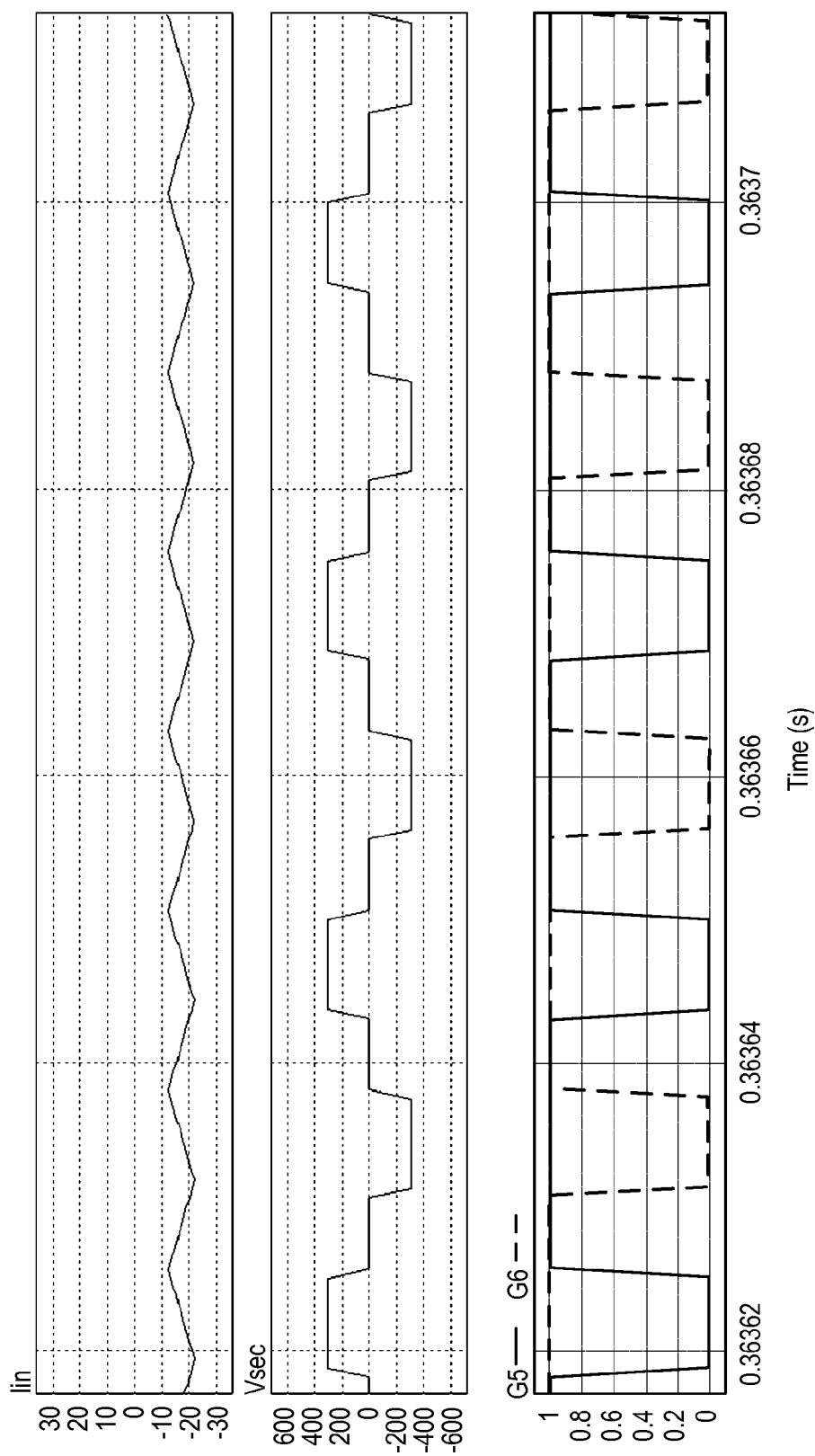
FIG. 10 illustrates a switching waveform during a first phase of the AC input waveform of a bidirectional AC-DC converter according to some embodiments.

Two regions in the AC input waveform 900 are highlighted to illustrate the operation of the switching circuits to generate the step or square wave that is applied to transformer secondary 306. The first region 910 is near the negative peak of the AC input waveform 900. The second region 911 is near the zero crossing of the AC input waveform 900. The switching events corresponding to these regions are illustrated in FIG. 9 and FIG. 10. FIG. 9 and FIG. 10 show an expanded view of the input inductor current Iin, the transformer secondary 306 waveform Vsec, and the gate signals G5 and G6 during the highlighted regions of AC input waveform 900. According to some embodiments, the gate signals G5-G6 are switched at approximately 40 kHz.

FIG. 10 illustrates the switching events corresponding to the first region 910 near the negative peak of AC input waveform 900, according to some embodiments. As illustrated, near the negative peak of AC input waveform 900, the magnitude of the current levels Iin on the input inductor is high. To keep the DC output current at a steady level, the overlapping portion of the two gate signals G5 and G6 is kept small, resulting in less current boosting time in the input inductor. The gate signals G5 and G6 are switched in a similar manner near the positive peak of AC input waveform 900 to keep the DC output current at the desired level during positive peaks.

Figure 11:
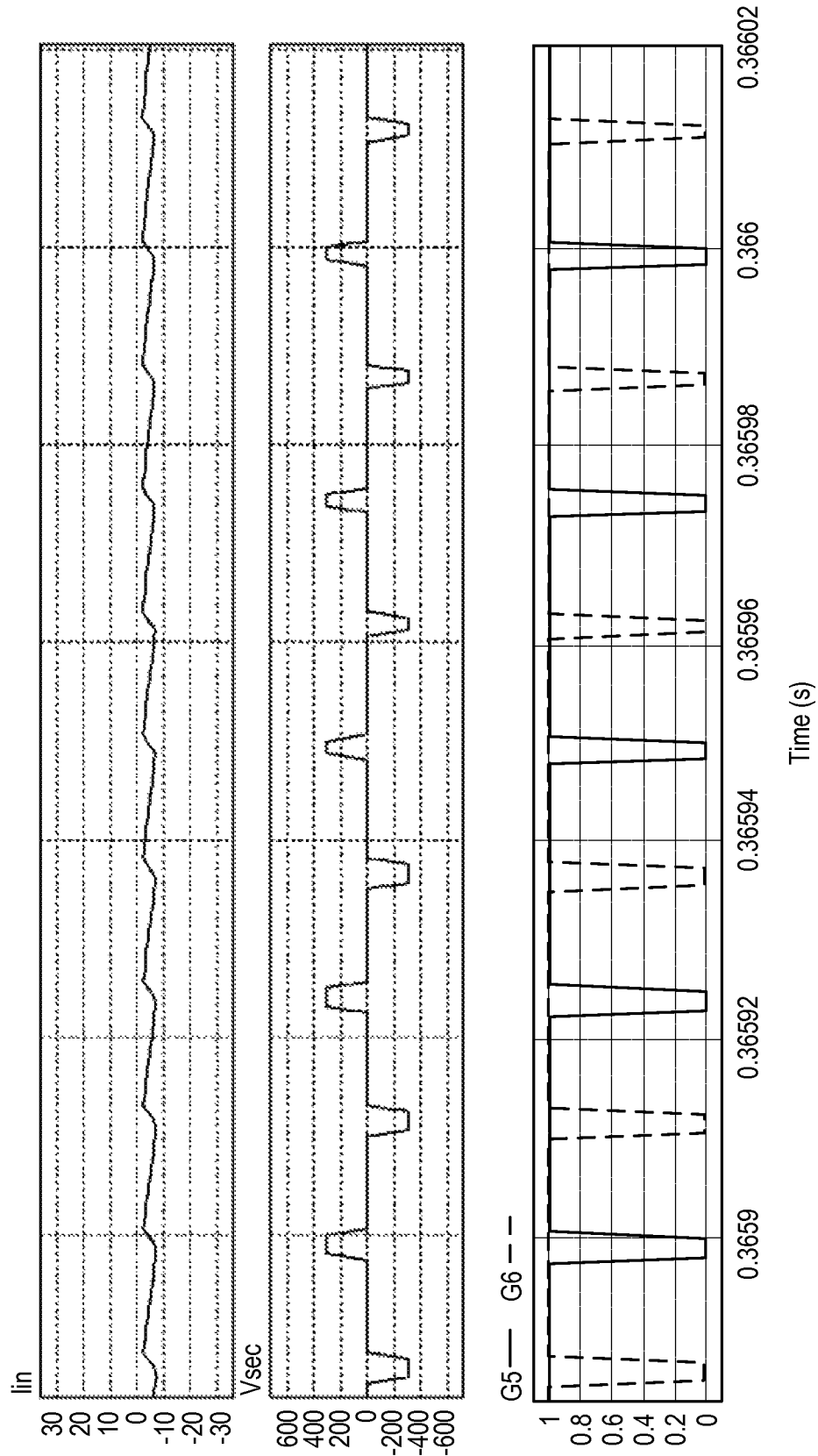
FIG. 11 illustrates a switching waveform during a second phase of the AC input waveform of a bidirectional AC-DC converter according to some embodiments.

FIG. 11 illustrates the switching events corresponding to the first region 911 near the zero crossing of AC input waveform 900, according to some embodiments. As illustrated, near the zero crossing of AC input waveform 900, the magnitude of the current levels Iin on the input inductor is lower. To keep the DC output current at the steady level, the overlapping portion of the two gate signals G5 and G6 is increased, resulting in more current boosting time in the input inductor.

In the charger mode of operation, gate signals G1-G4 used in the H-bridge section 302 are allowed to be in an idle state since the H-bridge section 302 acts as a pure rectifier in this mode of operation. In some embodiments, gate signals G1-G4 can be switched synchronously with G5 and G6 to improve overall system efficiency by using the H-bridge section 302 as a synchronous rectifier.

FIG. 12 illustrates a DC-DC converter 1200 that can be used in bidirectional power converter 200 according to some embodiments of the invention. DC-DC converter 1200 can be coupled to the DC bus 312 of AC-DC converter 300 to buck a high voltage signal from the battery or to boost a low voltage signal from the AC-DC converter 300. DC-DC converter 1200 has a high voltage terminal V_HV that can receive or output a high voltage signal and a low voltage terminal V_LV that can receive or output a low voltage signal. In some embodiments, the low voltage terminal V_LV can be coupled to the positive terminal of DC bus 312 of AC-DC converter 300 to provide DC to DC conversion between a high voltage battery and AC-DC converter 300. In some embodiments, DC-DC converter 1200 can be implemented as a neutral point clamp (NPC) converter as shown.

DC-DC converter 1200 includes four switching circuits SW11, SW12. SW13, and SW14 coupled in series. Each or any of switching circuits SW11, SW12, SW13, and SW14 can be implemented using a transistor switch such as a FET (e.g., MOSFET, as shown), a BJT, a IGBT, or other suitable types of switching element. Each or any of switching circuits SW11, SW12 SW13, and SW14 may further include a diode coupled in parallel with the transistor switch. The diode can be arranged with the cathode terminal towards the higher voltage potential and the anode terminal towards the lower voltage potential.

A first terminal of switching circuit SW11 is coupled to high voltage terminal V_HV, and a second terminal of switching circuit SW11 is coupled to switching circuit SW12 and to a cathode terminal of diode D11. The anode terminal of D11 is coupled to high voltage terminal V_HV through a filtering capacitor C11. Switching circuit SW11 is controlled by gate signal G11. A first terminal of switching circuit SW12 is coupled to the second terminal of switching circuit SW11 and to the cathode terminal of diode D11, and a second terminal of switching circuit SW12 is coupled to low voltage terminal V_LV through a filtering inductor L11 and to switching circuit SW13. Switching circuit SW12 is controlled by gate signal G12.

A first terminal of switching circuit SW13 is coupled to low voltage terminal V_LV through filtering inductor L11 and to the second terminal of switching circuit SW12, and a second terminal of switching circuit SW13 is coupled to switching circuit SW14 and an anode terminal of diode D13. The cathode terminal of D11 is coupled to low voltage terminal V_LV. Switching circuit SW13 is controlled by gate signal G13. A first terminal of switching circuit SW14 is coupled to the second terminal of switching circuit SW13 and to the anode terminal of diode D13, and a second terminal of switching circuit SW14 is coupled to low voltage terminal V_LV through a filtering capacitor C13. Switching circuit SW14 is controlled by gate signal G14. In some embodiments, the second terminal of switching circuit SW14 is at a ground or common potential.

As illustrated, only two filter capacitors C11 and C13 are used in DC-to-DC converter 1200. When operated in the boosting mode, a low DC voltage is applied to low voltage terminal V_LV, and DC-to-DC converter 1200 boosts the low DC voltage to provide a high DC output voltage at high voltage terminal V_HV. When operated in buck mode, the converter will reduce a high DC voltage applied at high voltage terminal V_HV to provide a low DC output voltage at low voltage terminal V_LV.

Figure 15:
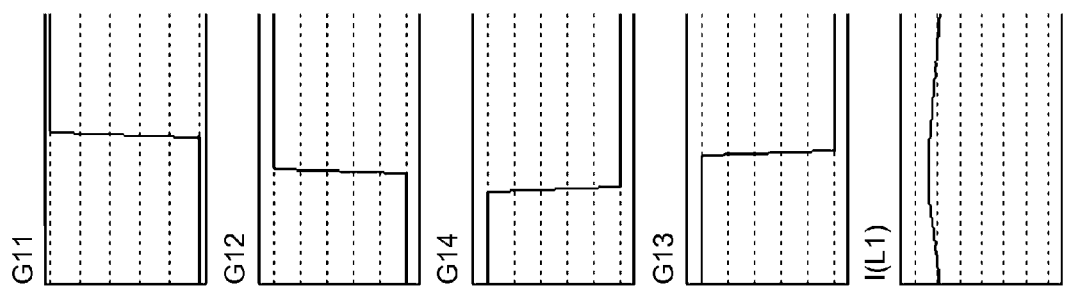
FIG. 15 illustrates a second phase of a switching waveform of a bidirectional DC-DC converter according to some embodiments.
Figure 14:
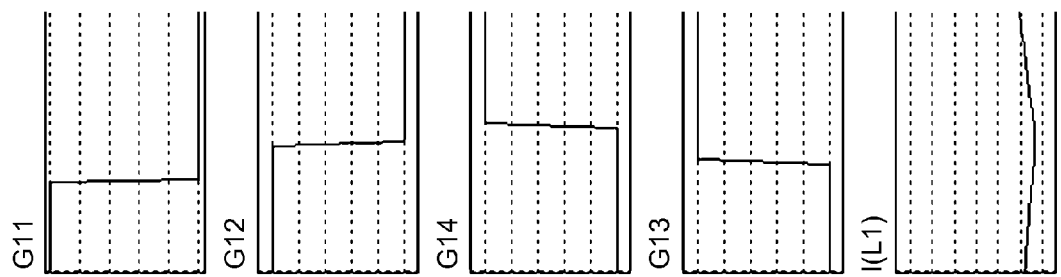
FIG. 14 illustrates a first phase of a switching waveform of a bidirectional DC-DC converter according to some embodiments.

FIG. 13 illustrates the switching scheme 1300 used in DC-to-DC converter 1200, according to some embodiments. Two regions 1314 and 1315 at different phases of the switching scheme are highlighted. Expanded views of the two regions 1314 and 1315 are shown in FIG. 14 and FIG. 15, respectively. The switching scheme utilizes four gate signals G11, G12, G13, and G14, and each is applied to a respective switching circuit SW11, SW12, SW13, and SW14. According to some embodiments, the gate signals G11-G14 are switched at approximately 40 kHz. In order to minimize the voltage stress applied to each switching circuit, the gate signals are appropriately staggered, as shown in FIG. 14 and FIG. 15, to ensure that a diode free-wheeling action occurs within each switching interval to guarantee that the maximum switching voltage experienced by the switching circuit is clamped to a neutral point, for example, to the low voltage terminal V_LV. This allows switching circuit elements that are rated at a limited voltage rating to be used to provided much higher voltage levels. For example, a MOSFET may be rated at 650 Volts, and the topology of DC-to-DC converter 1200 according to embodiments of the invention allows such a MOSFET to be used to provide a V_HV of up to 850 Volts or higher and V_LV of up to 450 Volts or higher.

Figure 16:
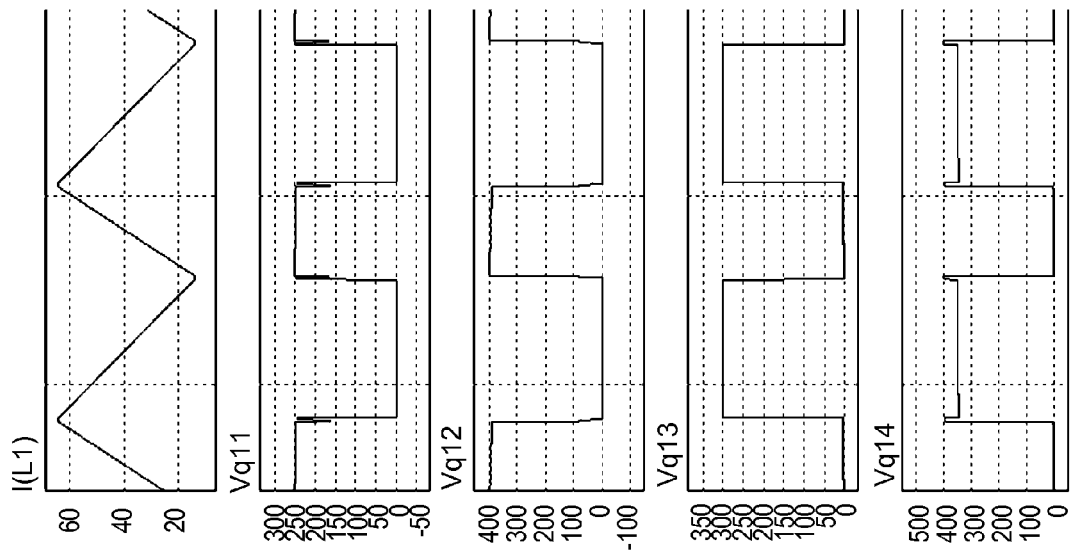
FIG. 16 illustrates a voltage waveform of a bidirectional DC-DC converter according to some embodiments.

FIG. 16 shows the blocking (i.e. clamped) voltages across the diodes of each switching circuits SW11, SW12, SW13, and SW14 when DC-to-DC converter is operated in the boost mode with a V_LV input of 400 Volts and producing a V_HV output of 650 Volts, according to some embodiments. As illustrated, the switching voltages experienced by the switch circuits are clamped to be below 450 Volts while producing an output of 650 Volts (e.g., sum of Vq11 and Vq22, or sum of Vq13 and Vq14). The control signals and switching voltages are similar when operating in the buck mode.

Figure 17:
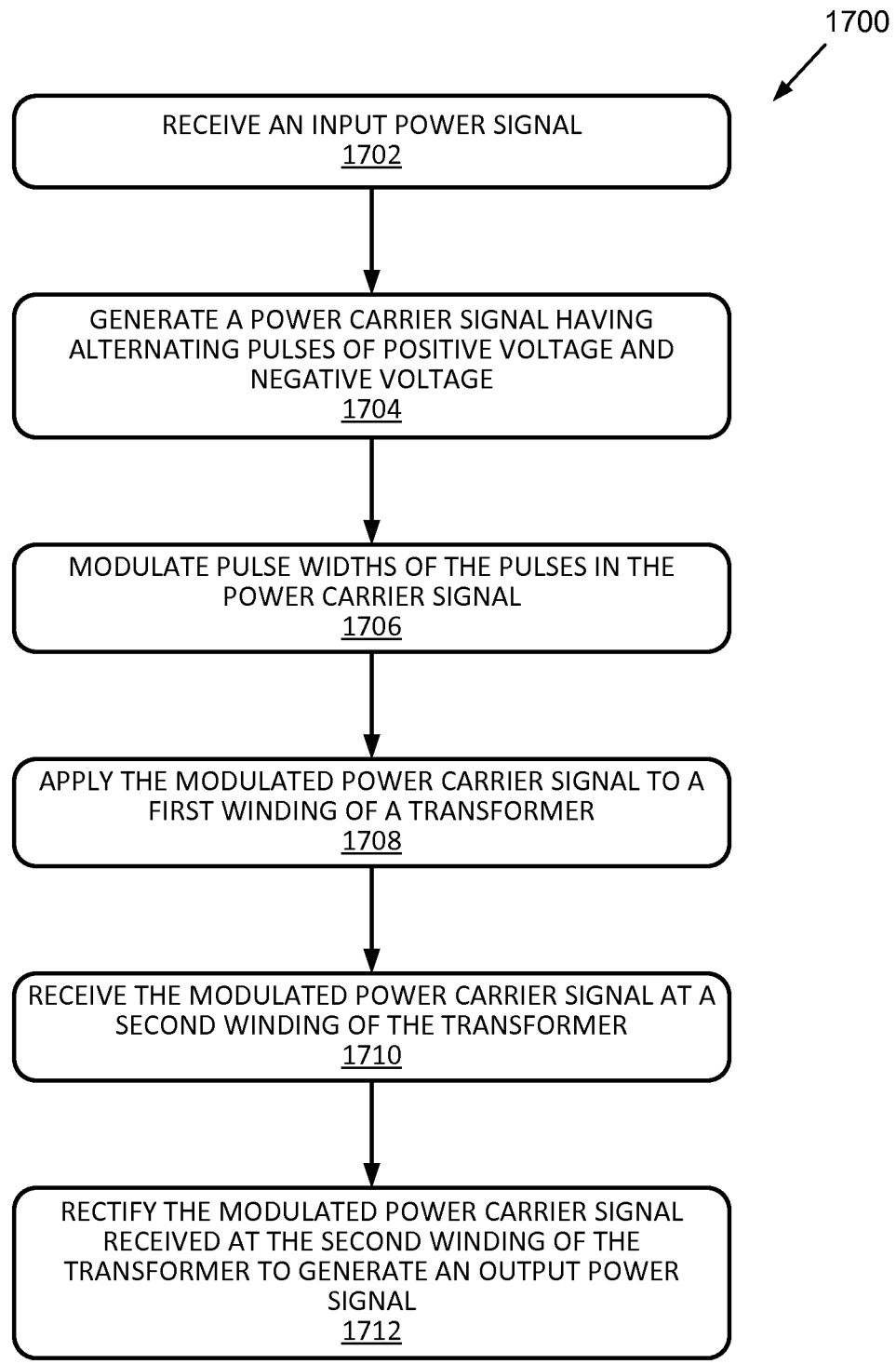
FIG. 17 illustrates a flow diagram of a power conversion method according to some embodiments.

FIG. 17 shows a flow diagram 1700 for a power conversion method according to some embodiments. At block 1702, a power signal is received. At block 1704, a power carrier signal is generated. The power carrier signal includes high frequency alternating pulses of positive voltage pulse and negative voltage pulse. At block 1706, the pulse widths of the power carrier signal is modulated to adjust the duty cycle of the pulses. At block 1708, the modulated power carrier signal is applied to a first winding of a transformer (e.g., a transformer primary). At block 1710, the modulated power carrier signal is received at a second winding of the transformer (e.g., transformer secondary). At block 1712, the modulated power carrier signal is rectified to generated a converted power signal.

When the power signal received at block 1702 is a DC voltage signal, the power carrier signal can be generated and modulated by a H-bridge circuit using the techniques described above, for example, by phase shifting the switching signals on the two legs of the H-bridge circuit with respect to each other. The modulated power signal can be rectified by a cyclo-inverter circuit. The switching signals in the cyclo-inverter circuit is synchronized with the switching signals in the H-bridge circuit to convert the DC voltage signal into a sinusoidal AC voltage signal.

When the power signal received at block 1702 is a AC voltage signal, the power carrier signal can be generated and modulated by a cyclo-inverter circuit using the techniques described above, for example, by adjusting the duty cycles of the switching signals in the cyclo-inverter circuit to control the overlap time of the switches to adjust the current boosting time. The modulated power signal can be rectified by a H-bridge circuit to generate a DC voltage signal.

Figure 18:
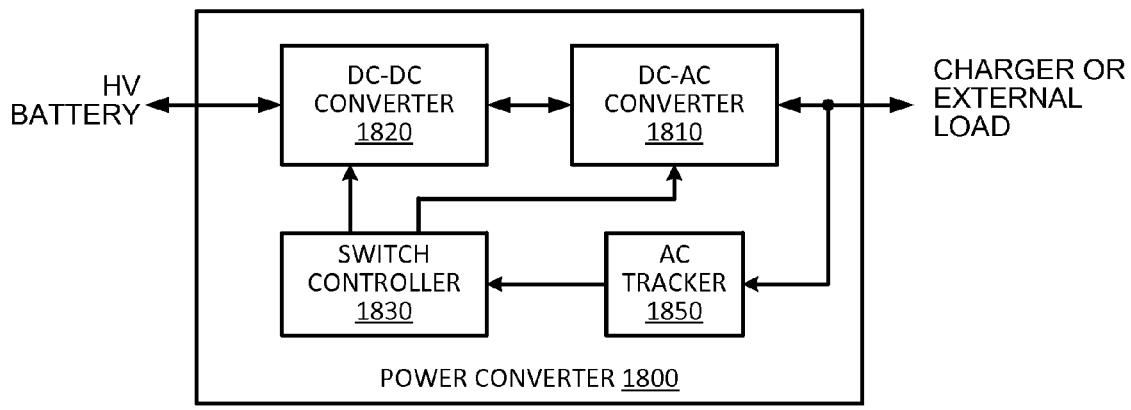
FIG. 18 illustrates a block diagram of an alternative bidirectional power converter according to some embodiments.

FIG. 18 illustrates a block diagram of another exemplary bidirectional power converter 1800 according to some embodiments. Bidirectional power converter 1800 includes AC-DC converter 1810 coupled to DC-DC converter 1820. In some embodiments, AC-DC converter 1810 can be implemented as a H-bridge and a cyclo-inverter, and DC-DC converter 1820 can be implemented as a buck-boost or neutral point clamp converter. Bidirectional power converter 1800 also includes a switch controller 1830 that is used to control the switching circuits in AC-DC converter 1810 and DC-DC converter 1820. Switch controller 1830 can be implemented with one or more programmable logic devices (PLD) such as programmable logic array or array logic devices (PLAs/PALs), complex programmable logic devices (CPLDs), and/or field programmable gate array devices (FPGAs). In some embodiments, switch controller 1830 can be implemented with one or more data processing devices such as microprocessors or microcontroller that are coupled to a memory storing computer readable code for performing the functionalities of switch controller 1830. The functionality and operation of these components are similar to those discussed above with reference to bidirectional power converter 200 of FIG. 2, and hence a detailed description of which need not be repeated.

Bidirectional power converter 1800 further includes an AC tracker 1850 that is used to filter and track the input AC power signal in the charger mode of operation. It should be understood that although AC tracker 1850 is illustrated as a component separate from switch controller 1830, one or more components of AC tracker 1850 can be implemented as part of or be integrated into switch controller 1830. According to some embodiments, the input AC power signal in the charger mode of operation can be a power signal originating from an electric power grid or some other power source. Due to variations of the electrical loads drawing power from the power source and/or other environmental disturbances, the input AC power signal received at bidirectional power converter 1800 may be susceptible to noise and distortions (e.g., harmonic frequencies, unbalanced input current, etc.) causing the input AC power signal to deviate away from an ideal sinusoidal wave. As discussed above, switch controller 1830 generates the gate signals for operating the various switching gates in the bidirectional power converter. The timing and duty cycles of the gate signals can be controlled based in part on the instantaneous phase (i.e. location along the sinusoid) of the input AC power signal. Thus, using a distorted input AC power signal as a reference to control the timing and duty cycles of the gate signals may cause errors in the charging current and voltage, resulting in a reduction in power factor and a loss of efficiency. By using AC tracker 1850 to filter and track the input AC power signal, noise and distortions on the input AC power signal can be identified and compensated by the switch controller 1830 such that bidirectional power converter 1850 can maintain a high power factor despite noise and distortions on the input AC power signal.

In some embodiments, AC tracker 1850 can be implemented as a recursive filter such as a Kalman filter that samples and tracks various state variables of the input AC power signal. Given a known frequency of the input AC power signal to track (e.g., 60 Hz fundamental line frequency), a Kalman filter can be designed with the appropriate coefficients to provide an estimation of the signal from a series of noisy or distorted samples. Examples of state variables used in the Kalman filter can include the sine component, the cosine component, and the DC bias component of the input AC power signal, etc. The output of the Kalman filter can be provided to switch controller 1830 such that disturbances on the input AC power signal are filtered or compensated when controlling the timing and duty cycles of the gate signals. Furthermore, the output of the Kalman filter can also provide additional information such as the DC bias of the input AC power signal, which can be compensated to produce a balanced input current. In some embodiments, additional Kalman filters can also be used to track other characteristics of the input AC power signal using different state variables such as the RMS voltage, current, harmonic components (e.g., $3^{rd}$ and $5^{th}$ harmonics, etc.). Furthermore, other types of filters can also be used. For example, adaptive notch filter, linear approximation filter (e.g., Butterworth, elliptic, etc.), or predictive digital filtering can be used.

Figure 19:
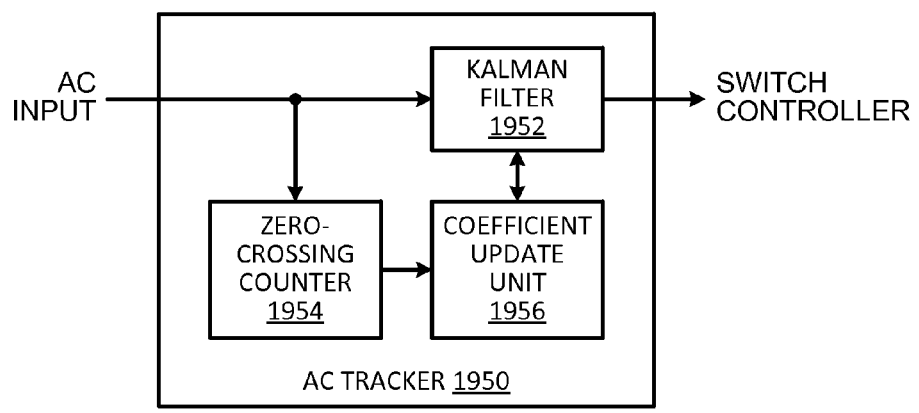
FIG. 19 illustrates a block diagram of an AC power signal tracker according to some embodiments.

FIG. 19 illustrates a block diagram of another exemplary AC tracker 1950, according to some embodiments. AC tracker 1950 includes an adaptive Kalman filter 1952, a zero-cross counter 1954, and a Kalman filter coefficient update unit 1956. As discussed above, the coefficients used in a Kalman filter are designed for tracking a signal at a particular frequency (e.g., 60 Hz fundamental line frequency). If the input AC power signal deviates from this frequency, the phase lead or phase lag of the filter may change, causing the performance of the Kalman filter to deteriorate. As a result, using the output of a Kalman filter with static coefficients to control the timing and duty cycles of the gate signals at frequencies away from the ideal line frequency that the Kalman filtered is designed to track may yield increasingly poor power factor and high harmonic distortion. According to some embodiments, bidirectional power converter 1800 may be operable to accept an input line frequency in the range of approximately 47-63 Hz or beyond. Thus, in order to account for the range of acceptable input line frequencies, AC tracker 1950 uses an adaptive Kalman filter 1952 with variable coefficients that are selected or derived based on the input line frequency. According to some embodiments, the use of adaptive Kalman filter 1952 can achieve a power factor of 99% or above and a total harmonic distortion of about 10% or less over the entire range of input AC frequency between 47 to 63 Hz.

To determine the line frequency of the input AC power signal, zero-cross counter 1954 can be used to estimate the frequency of the input AC power signal. In some embodiments, zero-cross counter 1954 can operate with a clock frequency of, for example, 38.4 Hz, and counts the number of clock cycles between positive zero crossings (going from negative voltage to positive voltage) of the input AC power signal voltage waveform, or alternatively counts the number of clock cycles between negative zero crossings (going from positive voltage to negative voltage) of the input AC power signal voltage waveform. Thus, for a perfect 60 Hz input AC power signal, zero-cross counter 1954 may output a zero-cross count of 640 counts; for a 47 Hz input AC power signal, zero-cross counter 1954 may output a zero-cross count of 817 counts; and for a 63 Hz input AC power signal, zero-cross counter 1954 may output a zero-cross count of 609 counts, etc. As the input line frequency drifts, the output of zero-cross counter 1954 can be provided to coefficient update unit 1956 to update the coefficients used in adaptive Kalman filter 1952 to match the input line frequency. It should be understood that in other embodiments, zero-cross counter 1954 can operate at other clock frequencies.

Figure 20:
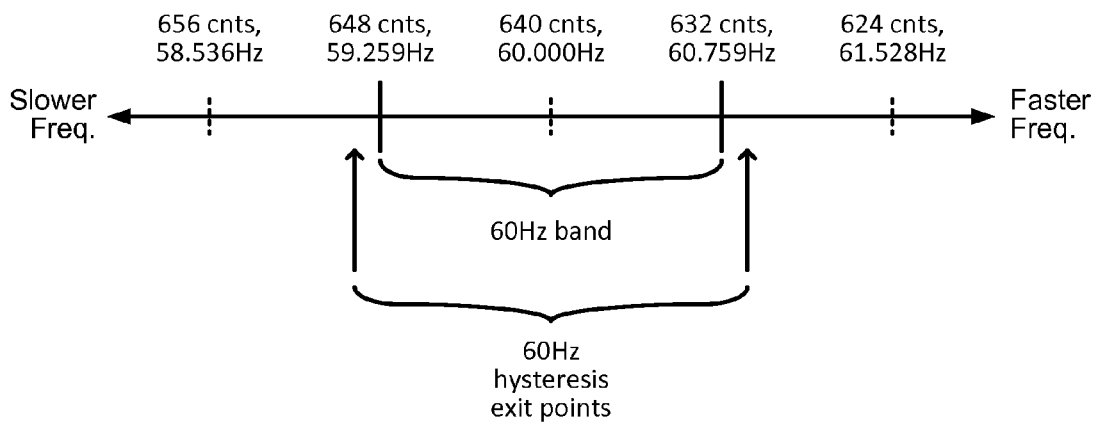
FIG. 20 illustrates a frequency band diagram according to some embodiments.

Accordingly to some embodiments, coefficient update unit 1956 can be implemented with a lookup table or with a calculation module that calculates the appropriate Kalman filter coefficients in real time. In embodiments in which coefficient update unit 1956 is implemented as a lookup table, the range of operating input line frequencies can be divided into a number of frequency bands based on the zero-cross counts received from zero-crossing counter 1954. For example, as illustrated in FIG. 20, the range of operating input line frequencies can be divided into frequency bands that are 16 zero-cross counts wide centered around a midpoint frequency. Thus, a zero-cross count in the range of 632 to 648 corresponds to the 60 Hz frequency band. In some embodiments, to cover the input line frequency range of approximately 47-63 Hz, 13 to 14 frequency bands can be used. For each frequency band, a set of Kalman filter coefficients appropriate for the corresponding midpoint frequency can be stored in the lookup table. The zero-cross count provided by the zero-cross counter 1954 can be used as an index into the table entry to lookup the appropriate Kalman filter coefficients to use.

In some embodiments, coefficient update unit 1956 can implement a hysteresis for moving between adjacent frequency bands. The use of a hysteresis can reduce the number of coefficient changes due to small fluctuations in the zero-cross counts or line frequency. For example, FIG. 20 illustrates a hysteresis of ±10 zero-cross counts to move from the 60 Hz frequency band to an adjacent frequency band according to some embodiments. In other words, if the current zero-cross count falls in the range of 632 to 648 counts, and a new zero-cross count of 649 (i.e. less than 640 plus 10 counts) is received from the zero-cross counter 1954, coefficient update unit 1956 does not update the Kalman filter to use the 58.536 Hz frequency band coefficients. However, if a new zero-cross count of 651 (greater than 640 plus 10 counts) is received from the zero-cross counter 1954, coefficient update unit 1956 updates the Kalman filter to use the 58.536 Hz frequency band coefficients. In some embodiments, two or more consecutive zero-cross counts beyond the hysteresis exit points may be needed to change the Kalman filter coefficients to an adjacent frequency band, but if a single sudden large change in frequency beyond a threshold is detected (e.g., two or more frequency bands jump), coefficient update unit 1956 can update the Kalman filter to use the coefficients for the new frequency band immediately. It should be understood that in other embodiments, the range of input line frequency can be divided into frequency bands of other granularities (e.g., into 26-27 frequency bands of 8 zero-cross counts each, etc.), and that other hysteresis exit points and thresholds can be used.

In some embodiments, instead of storing the Kalman coefficients in a lookup table, the Kalman coefficients for a particular input line frequency can be calculated in real time as the line frequency changes. For example, in some embodiments, the coefficients of the Kalman filter are linearly proportional to the frequency of the input signal. Thus, by knowing the input frequency, the appropriate Kalman filter coefficients for the particular line frequency of the input signal can be calculated with a set of linear equations. In some embodiments, the zero-cross counts from zero-cross counter 1954 can be plugged directly into the linear equations to derive the Kalman filter coefficients. In other embodiments, the zero-cross counts can be correlated with a set of frequency bands similar to those discussed above, and the midpoint frequency of the corresponding frequency band can be used to calculate the Kalman filter coefficients. A hysteresis and consecutive number of zero-cross counts beyond the hysteresis exit points can also be used to move from one frequency band to an adjacent frequency band.

Figure 21:
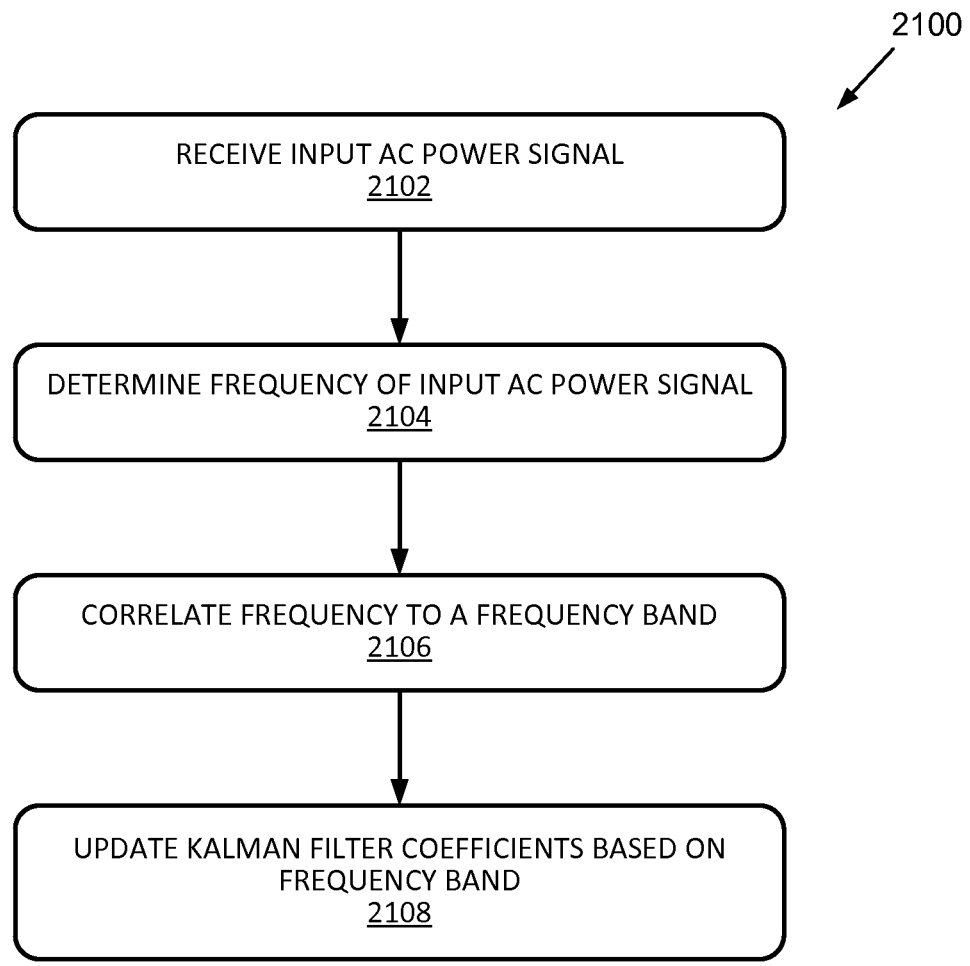
FIG. 21 illustrates a flow diagram of a AC input signal filtering method according to some embodiments.

FIG. 21 illustrates a flow diagram 2100 for filtering and tracking an AC power signal (e.g., at the input of a bidirectional power converter), according to some embodiments. At block 2102, an AC power signal is received. At block 2104, the frequency of the AC power signal is determined. The frequency can be determined, for example, by counting the number of high frequency clock cycles (e.g., a high frequency clock in the order of 100 times or more faster than the expected frequency of the AC power signal, etc.) between positive zero crossings of the AC power signal voltage waveform, or between negative zero crossings of the AC power signal voltage waveform. In some embodiments, at block 2106, the determined frequency can be correlated to a frequency band covering a range of frequencies that includes the determined frequency. At block 2108, the coefficients of a Kalman filter used for filtering the AC power signal can be updated based on the determined frequency or the midpoint frequency of the frequency band. In some embodiments, the coefficients can be calculated in real time or can be derived from looking up the appropriate coefficients from a lookup table. According to some embodiments, the filtered AC power signal can be provided to a switch controller to calculate the duty cycles of the gate signals of a bidirectional power converter.

Figure 22:
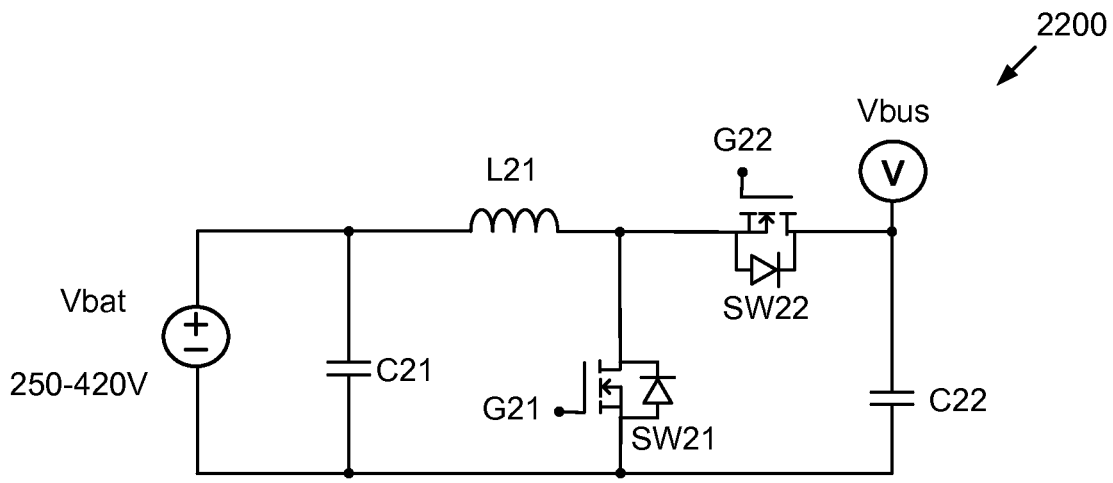
FIG. 22 illustrates a circuit diagram of a bidirectional DC-DC converter according to some embodiments.

FIG. 22 illustrates an alternative DC-DC converter 2200 that can be used in a bidirectional power converter according to some embodiments. As shown, DC-DC converter 2200 is implemented as a buck-boost converter, and the Vbus of DC-DC converter 2200 can be coupled to the DC bus 312 of AC-DC converter 300 to implement some embodiments of a bidirectional power converter. In some embodiments, DC-DC converter 2200 can operate with a battery voltage from 250 V to 420 V and a Vbus voltage from 400 V to 440 V depending on the amplitude of the battery voltage.

DC-DC converter 2200 includes two switching circuits SW21 and SW22, a filtering capacitor C21, an inductor L21, and an output capacitor C22. Each or any of switching circuits SW21 and SW22, can be implemented using a transistor switch such as a FET (e.g., MOSFET, as shown), a BJT, a IGBT, or other suitable types of switching element. Each or any of switching circuits SW21 and SW22 further includes a diode coupled in parallel with the transistor switch. Filtering capacitor C21 is coupled in parallel with the battery. It should be understood that although filtering capacitor C21 is coupled in parallel with the battery, filtering capacitor C21 is not a bulk energy storage element, but is instead used as a filter to reduce switching ripples on the power signal. For example, filtering capacitor C21 may have a capacitance in the range of about 20-30 uF, whereas bulk energy storage capacitors for similar power levels of embodiments of the bidirectional power converter can be in the range of 5000 uF or more.

Switching circuit SW21 is coupled in parallel with filtering capacitor C21 and output capacitor C22. Inductor L21 is in series with the battery, and has a first terminal coupled to the positive terminal of the battery and filtering capacitor C21, and a second terminal coupled to switching circuit SW21 and switching circuit SW22. Switching circuit SW22 is coupled in series with inductor L21, and has a first terminal coupled to inductor L21 and switching circuit SW21, and a second terminal coupled to output capacitor C22.

Switching circuit SW21 is controlled by gate signal G21, and switching circuit SW22 is controlled by gate signal G22. In the boost mode of operation, switching circuit SW22 is opened, and switching circuit SW21 is switched on and off to control the amount of current supplied through inductor L21 to output capacitor C22 to boost the Vbus voltage. In the buck mode of operation, switching circuit SW22 and switching circuit SW21 are alternately switched on and off to control the amount of current provided to Vbus to limit the Vbus voltage. Gate signals G21 and G22 can be controlled by a switch controller such as switch controller 230 or 1830.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), flash memory, solid-state memory, a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A bidirectional power converter comprising:
   a H-bridge circuit including:
   a DC interface including a positive DC terminal and a negative DC terminal;
   a first H-bridge leg coupled across the DC interface, the first H-bridge leg including a first switching circuit controlled by a first switching signal, and a second switching circuit coupled to the first switching circuit in series and controlled by a second switching signal; and
   a second H-bridge leg coupled across the DC interface, the second H-bridge leg including a third switching circuit controlled by a third switching signal, and a fourth switching circuit coupled to the third switching circuit in series and controlled by a fourth switching signal; and
   a cyclo-inverter circuit electrically coupled to the H-bridge circuit, the cyclo-inverter circuit including;
   an AC interface including a first AC line terminal and a second AC line terminal;
   a first cyclo-inverter leg including a fifth switching circuit controlled by a fifth switching signal, and a sixth switching circuit coupled to the fifth switching circuit in series and controlled by a sixth gating signal, wherein the first AC line terminal is coupled between the fifth switching circuit and the sixth switching circuit, and wherein in a charger mode of operation, the duty cycles of the fifth switching signal and the sixth switching signal are varied; and
   a second cyclo-inverter leg including a seventh switching circuit controlled by the sixth gating signal, and an eight switching circuit coupled to the seventh switching circuit in series and controlled by the fifth switching signal, wherein the second AC line terminal is coupled between the fifth switching circuit and the sixth switching circuit.

2. The bidirectional power converter of claim 1, wherein in an export mode of operation, the first switching signal is 180 degrees out of phase with the second switching signal, the third switching signal is 180 degrees out of phase with the fourth switching signal, and the fifth switching signal is 180 degrees out of phase with the sixth switching signal.

3. The bidirectional power converter of claim 2, wherein in the export mode of operation, the phase of the first switching signal with respect to the third switching signal is varied.

4. The bidirectional power converter of claim 2, wherein in the export mode of operation, the fifth switching signal is switched synchronously with the first switching signal during a negative amplitude phase of an AC output, and the sixth switching signal is switched synchronously with the first switching signal during a positive amplitude phase of the AC output.

5. The bidirectional power converter of claim 1, wherein in the charger mode of operation, the first switching signal, the second switching signal, the third switching signal, and the fourth switching signal are idle.

6. The bidirectional power converter of claim 1, further comprising a DC-DC converter coupled to the DC interface.

7. The bidirectional power converter of claim 6, wherein the DC-DC converter is a neutral point clamped circuit controlled by a plurality of staggered switching signals.

8. The bidirectional power converter of claim 6, wherein the DC-DC converter is a buck-boost circuit.

9. The bidirectional power converter of claim 1, further comprising an AC tracker for filtering an input AC signal at the AC interface, the filtered input AC signal being used for controlling the switching circuits of the bidirectional power converter in a charger mode of operation.

10. The bidirectional power converter of claim 9, wherein the AC tracker includes:
    a recursive filter;

a zero-crossing counter for determining a line frequency at the AC interface; and a coefficient update unit for updating a plurality of coefficients used in the recursive filter.

11. The bidirectional power converter of claim 10, wherein the coefficient update unit updates the plurality of coefficients when the line frequency shifts from a first frequency band to a second frequency band.

12. The bidirectional power converter of claim 10, wherein the coefficient update unit updates the plurality of coefficients when changes in the line frequency satisfy a hysteresis.

13. The bidirectional power converter of claim 1, wherein power is transferred at an interface between the H-bridge circuit and the cyclo-inverter circuit without any AC line frequency component.

14. The bidirectional power converter of claim 1, wherein in a charger mode of operation, the switching circuits of the bidirectional power converter are controlled based on a target DC bus regulation voltage instead of being based on a feedback from an actual measured DC bus voltage.

15. The bidirectional power converter of claim 1, wherein in a charger mode of operation, the instantaneous output power on the DC interface is maintained to be approximately equal to the instantaneous input power on the AC interface.

16. A method for converting power, the method comprising:

receiving an input power signal;

generating a power carrier signal based on the input power signal and having alternating pulses of positive voltage and negative voltage;

modulating pulse widths of the alternating pulses in the power carrier signal;

applying the modulated power carrier signal to a first winding of a transformer;

receiving the modulated power carrier signal at a second winding of the transformer; and rectifying the modulated power carrier signal received at the second winding of the transformer to generate an output power signal, wherein when the input power signal is an input AC power signal, the output power signal is a output DC power signal, the method further comprises:

receiving the input AC power signal at a recursive filter;

determining a frequency of the input AC power signal;

correlating the determined frequency to a frequency band; and updating coefficients of the recursive filter based on the frequency band, and wherein when the input power signal is an input DC power signal, the output power signal is an output AC power signal and the modulated power carrier signal does not include a line frequency component of the output AC power signal.

17. The method of claim 16, wherein correlating the determined frequency to a frequency band is based on a hysteresis.

18. A bidirectional power converter comprising:

a H-bridge circuit including:
- a DC interface including a positive DC terminal and a negative DC terminal;
- a first H-bridge leg coupled across the DC interface, the first H-bridge leg including a first switching circuit controlled by a first switching signal, and a second switching circuit coupled to the first switching circuit in series and controlled by a second switching signal; and
- a second H-bridge leg coupled across the DC interface, the second H-bridge leg including a third switching circuit controlled by a third switching signal, and a fourth switching circuit coupled to the third switching circuit in series and controlled by a fourth switching signal;

a cyclo-inverter circuit electrically coupled to the H-bridge circuit, the cyclo-inverter circuit including:
- an AC interface including a first AC line terminal and a second AC line terminal;
- a first cyclo-inverter leg including a fifth switching circuit controlled by a fifth switching signal, and a sixth switching circuit coupled to the fifth switching circuit in series and controlled by a sixth gating signal, wherein the first AC line terminal is coupled between the fifth switching circuit and the sixth switching circuit; and
- a second cyclo-inverter leg including a seventh switching circuit controlled by the sixth gating signal, and an eight switching circuit coupled to the seventh switching circuit in series and controlled by the fifth switching signal, wherein the second AC line terminal is coupled between the fifth switching circuit and the sixth switching circuit; and an AC tracker for filtering an input AC signal at the AC interface, the filtered input AC signal being used for controlling the switching circuits of the bidirectional power converter in a charger mode of operation.

19. The bidirectional power converter of claim 18, wherein the AC tracker includes one or more of:

a recursive filter;

a zero-crossing counter for determining a line frequency at the AC interface; and a coefficient update unit for updating a plurality of coefficients used in the recursive filter.

* * * * *